(12) United States Patent
Han et al.

(10) Patent No.: US 7,907,592 B2
(45) Date of Patent: Mar. 15, 2011

(54) METHOD OF PERFORMING CELL SEARCH IN WIRELESS COMMUNICATION SYSTEM

(75) Inventors: Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 12/168,014

(22) Filed: Jul. 3, 2008

(65) Prior Publication Data
US 2009/0010312 A1  Jan. 8, 2009

(30) Foreign Application Priority Data

| Jul. 6, 2007 | (KR) | 10-2007-0068364 |
|---|---|---|
| Jul. 19, 2007 | (KR) | 10-2007-0072502 |
| Aug. 9, 2007 | (KR) | 10-2007-0080129 |
| Oct. 1, 2007 | (KR) | 10-2007-0098861 |

(51) Int. Cl.
| H04J 3/06 | (2006.01) |
|---|---|
| H04L 27/06 | (2006.01) |
| H04B 1/00 | (2006.01) |
| G06F 7/00 | (2006.01) |
| G06F 15/00 | (2006.01) |

(52) U.S. Cl. ......... 370/350; 375/342; 375/144; 708/492
(58) Field of Classification Search .................. 370/350, 370/342; 375/144; 708/492
See application file for complete search history.

(56) References Cited

U.S. PATENT DOCUMENTS

| 6,480,558 | B1 | 11/2002 | Ottosson et al. | |
|---|---|---|---|---|
| 6,731,673 | B1 | 5/2004 | Kotov et al. | |
| 6,760,361 | B2 * | 7/2004 | Nystrom et al. | 375/145 |
| 6,922,388 | B1 | 7/2005 | Laroia et al. | |
| 7,062,002 | B1 * | 6/2006 | Michel et al. | 375/354 |
| 7,158,505 | B2 | 1/2007 | Dick et al. | |
| 7,443,829 | B2 * | 10/2008 | Rizvi et al. | 370/342 |

(Continued)

FOREIGN PATENT DOCUMENTS

EP  1 643 660 A1  5/2006

(Continued)

OTHER PUBLICATIONS

M. Jamil, L.P.Linde, A Comparison of Unfiltered and Filtered Complex Spreading Sequences Based on a Periodic Correlation Properties.

*Primary Examiner* — Marivelisse Santiago-Cordero
(74) *Attorney, Agent, or Firm* — McKenna Long & Aldridge LLP

(57) ABSTRACT

A method of performing cell search includes receiving a primary synchronization signal (PSS) comprising a primary synchronization code (PSC), acquiring an unique identity from the PSS, receiving a secondary synchronization signal (SSS) which is associated with a cell identity group, the SSS comprising two secondary synchronization codes (SSCs) and acquiring a cell identity which is defined by the unique identity within the cell identity group, wherein the two SSCs are respectively scrambled by using two different scrambling codes. Detection performance on synchronization signals can be improved, and cell search can be performed more reliably.

13 Claims, 19 Drawing Sheets

U.S. PATENT DOCUMENTS

| | | |
|---|---|---|
| 7,738,437 B2 * | 6/2010 | Ma et al. .................. 370/342 |
| 2004/0008616 A1 | 1/2004 | Jung et al. |
| 2004/0085946 A1 * | 5/2004 | Morita et al. ............. 370/342 |
| 2005/0111522 A1 | 5/2005 | Sung et al. |
| 2006/0050799 A1 | 3/2006 | Hou et al. |
| 2006/0126491 A1 | 6/2006 | Ro et al. |
| 2008/0080439 A1 * | 4/2008 | Aziz et al. ................ 370/338 |
| 2008/0273522 A1 * | 11/2008 | Luo et al. ................. 370/350 |

FOREIGN PATENT DOCUMENTS

| | | |
|---|---|---|
| KR | 10-2004-0032021 | 4/2004 |
| KR | 10-2005-0011292 | 1/2005 |
| KR | 10-2005-0018333 | 2/2005 |
| KR | 10-2005-0091612 | 9/2005 |
| KR | 10-2006-0023863 | 3/2006 |
| KR | 10-2007-0050358 | 5/2007 |
| WO | WO 2006/129166 A1 | 12/2006 |

* cited by examiner

METHOD OF PERFORMING CELL SEARCH IN WIRELESS COMMUNICATION SYSTEM

CROSS-REFERENCE TO RELATED APPLICATIONS

This application claims the benefit of priority of Korean Patent Application No. 10-2007-0068364 filed on Jul. 6, 2007, Korean Patent Application No. 10-2007-0072502 filed on Jul. 19, 2007, Korean Patent Application No. 10-2007-0080129 filed on Aug. 9, 2007 and Korean Patent Application No. 10-2007-0098861 filed on Oct. 1, 2007, which are incorporated by reference in its entirety herein.

BACKGROUND

1. Technical Field

The present invention relates to wireless communication, and more particularly, to a method for performing cell search in a wireless communication system.

2. Related Art

Wide code division multiple access (WCDMA) systems of the 3rd generation partnership project (3GPP) use a total of 512 long pseudo-noise (PN) scrambling codes in order to identify base stations (BSs). As a scrambling code of a downlink channel, each BS uses a different long PN scrambling code.

When power is supplied to a user equipment (UE), the UE performs downlink synchronization of a cell and acquires a long PN scrambling code identifier (ID) of the cell. Such a process is generally referred to as a cell search. The cell search is the procedure by which a user equipment acquires time and frequency synchronization with a cell and detects the cell identity of the cell. The initial cell is determined according to a location of the UE at a time when the power is supplied. In general, the initial cell indicates a cell of a BS corresponding to the greatest one of signal components of all BSs, which are included in a downlink reception signal of the UE.

To facilitate the cell search, a WCDMA system divides 512 long PN scrambling codes into 64 code groups, and uses a downlink channel including a primary synchronization channel (P-SCH) and a secondary synchronization channel (S-SCH). The P-SCH is used to allow the UE to acquire slot synchronization. The S-SCH is used to allow the UE to acquire frame synchronization and a scrambling code group.

In general, cell search is classified into initial cell search, which is initially performed when a UE is powered on, and non-initial search which performs handover or neighbor cell measurement.

In the WCDMA system, the cell search is accomplished in three steps. In the first step, a UE acquires slot synchronization by using a P-SCH including a primary synchronization code (PSC). A frame includes 15 slots, and each BS transmits the frame by including a PSC. Herein, the same PSC is used for the 15 slots, and all BSs use the same PSC. The UE acquires the slot synchronization by using a matched filter suitable for the PSC. In the second step, a long PN scrambling code group and frame synchronization are acquired by using the slot synchronization and also by using a S-SCH including a secondary synchronization code (SSC). In the third step, by using a common pilot channel code correlator on the basis of the frame synchronization and the long PN scrambling code group, the UE detects a long PN scrambling code ID corresponding to a long PN scrambling code used by the initial cell. That is, since 8 long PN scrambling codes are mapped to one long PN scrambling code group, the UE computes correlation values of all of the 8 long PN scrambling codes belonging to a code group of the UE. On the basis of the computation result, the UE detects the long PN scrambling code ID of the initial cell.

Since the WCDMA system is an asynchronous system, only one PSC is used in the P-SCH. However, considering that a next generation wireless communication system has to support both synchronous and asynchronous modes, there is a need for using a plurality of PSCs.

If errors occur while detecting the S-SCH, delay occurs when a UE performs cell search. Therefore, there is a need to improve channel detection performance in the cell search procedure.

SUMMARY

A method is sought for improving detection performance by performing scrambling in such a manner that different scrambling codes are used for a secondary synchronization signal.

A method is also sought for performing a reliable cell search by improving detection performance on the secondary synchronization signal.

A method is also sought for transmitting synchronization signals by improving detection performance on the synchronization signals.

In an aspect, a method of performing cell search in a wireless communication system is provided. The method includes receiving a primary synchronization signal (PSS) comprising a primary synchronization code (PSC), acquiring an unique identity from the PSS, receiving a secondary synchronization signal (SSS) which is associated with a cell identity group, the SSS comprising two secondary synchronization codes (SSCs) and acquiring a cell identity which is defined by the unique identity within the cell identity group, wherein the two SSCs are respectively scrambled by using two different scrambling codes, the two SSCs are defined by m-sequences generated by a generating polynomial $x^5+x^2+1$, and the two scrambling codes are defined by m-sequences generated by a generating polynomial $x^5+x^3+1$.

The SSS can include a first SSS and a second SSS. The two scrambling codes used for the first SSS are the same as the two scrambling codes used for the second SSS. A first SSC of the first SSS is scrambled by using a first scrambling code, a second SSC of the first SSS is scrambled by using a second scrambling code, a first SSC of the second SSS is scrambled by using the second scrambling code, and a second SSC of the second SSS is scrambled by using the first scrambling code.

In another aspect, a method of transmitting synchronization signals in a wireless communication system is provided. The method includes transmitting a PSS comprising a PSC and transmitting a first SSS comprising a first SSC and a second SSC, wherein the first SSC is scrambled by using a first scrambling code and the second SSC is scrambled by using a second scrambling code, wherein the first SSC and the second SSC are defined by m-sequences generated by a generating polynomial $x^5+x^2+1$, and the first scrambling code and the second scrambling code are defined by m-sequences generated by a generating polynomial $x^5+x^3+1$.

In still another aspect, a method of acquiring synchronization signals in a wireless communication system is provided. The method includes identifying a PSC by a PSS transmitted from a base station and identifying two SSCs by a SSS transmitted from the base station, wherein the two SSCs are respectively scrambled by using two different scrambling codes, the two SSCs are defined by m-sequences generated by a generating polynomial $x^5+x^2+1$, and the two scrambling codes are defined by m-sequences generated by a generating polynomial $x^5+x^3+1$.

DESCRIPTION OF EXEMPLARY EMBODIMENTS

Figure 1:
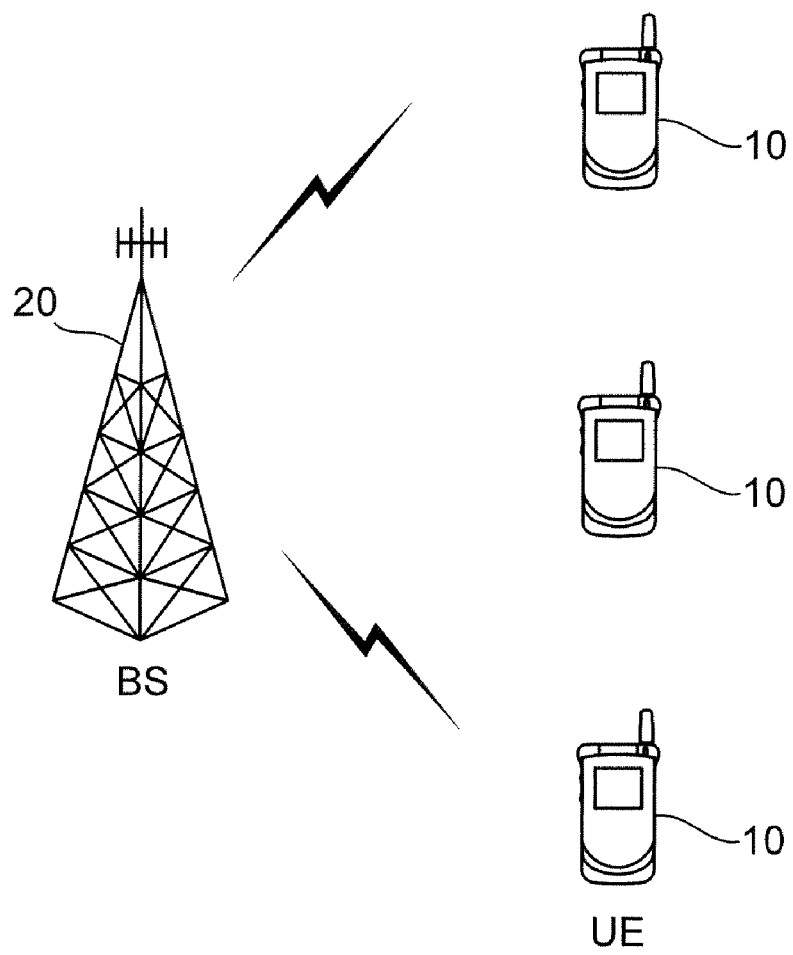
FIG. 1 shows a structure of a wireless communication system.

FIG. 1 shows a structure of a wireless communication system. The wireless communication system can be widely deployed to provide a variety of communication services, such as voices, packet data, etc.

Referring to FIG. 1, a wireless communication system includes a user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers.

I. Sequence Generation

According to an embodiment of the present invention, a pseudo-noise (PN) sequence is used as a sequence applied to a secondary synchronization signal (SSS). The PN sequence can be reproduced and shows a characteristic similar to a random sequence. The PN sequence is characterized as follows. (1) A repetition period is sufficiently long. If a sequence has an infinitely long repetition period, the sequence is a random sequence. (2) The number of 0s is close to the number of 1s within one period. (3) A portion having a run length of 1 is ½, a portion having a run length of 2 is ¼, a portion having a run length of 3 is ⅛, and so on. Herein, the run length is defined as the number of contiguous identical symbols. (4) A cross-correlation between sequences within one period is significantly small. (5) A whole sequence cannot be reproduced by using small sequence pieces. (6) Reproducing is possible by using a proper reproducing algorithm.

A PN sequence includes an m-sequence, a gold sequence, a Kasami sequence, etc. For clarity, the m-sequence will be described as an example. In addition to the aforementioned characteristic, the m-sequence has an additional characteristic in which a side lobe of a periodic auto-correlation is −1.

An example of a generating polynomial for generating an m-sequence $c_k$ can be expressed as $$c_k = x^5 + x^2 + 1 \text{ over GF(2)} \quad \text{[Equation 1]}$$

where GF denotes a Galois Field, and GF(2) represents a binary signal.

A maximum length generated by Equation 1 is $2^5-1=31$. In this case, according to a generated state, a total of 31 sequences can be generated. This coincides with a maximum number of sequences (i.e., 31) that can be generated by using a cyclic shift after an arbitrary m-sequence is generated by Equation 1. This means that a maximum of 31 pieces of information can be transmitted. Even if the information is simple, more than 31 pieces of information cannot be transmitted.

According to another embodiment of the present invention, if an m-sequence is defined as d(n), a sequence set S1 for all available sequences can be expressed as S1={$d^m(k)$|m is a sequence index} where m=0,1,...,N−1 and k=0,1,...,N−1. N is $N=2^n-1$ where n is a maximum degree. For example, in the case of the generating polynomial of Equation 1, n=5 and N=31.

A new sequence $g^m(k)$ is defined by $g^m(k)=d^m(N-1-k)$, m=0,1,..., N−1, k=0,1,..., N−1. A sequence set S2 is defined by S2={$g^m(k)$|m is a sequence index}. A sequence set S3 can be defined by S3={S1,S2}. Characteristics of the m-sequence are kept in S1 and S2. A random sequence property is maintained between S1 and S2. Therefore, a sequence having a good correlation property can be generated within a corresponding sequence set, and the number of available sequences can be increased without using an additional memory or without increasing overhead.

In particular, the m-sequence can be generated by an n-th degree polynomial as shown $$a_0 x^n + a_1 x^{n-1} + \ldots + a_{n-1} 1 \quad \text{[Equation 2]}$$

where k=0,1,..., n−1, and $a_k=0$ or 1.

By using the definition of the sequence $g^m(k)$, the m-sequence can be converted into one of m-sequences generated as shown $$a_{n-1} x^{n-0} + a_{n-2} x^{n-1} + \ldots + a_0 x^{n-n} = a_{n-1} x^n + a_{n-2} x^{n-1} + \ldots + a_0 1 \quad \text{[Equation 3]}$$

where k=0,1,..., n−1, and $a_k=0$ or 1. This means that coefficients of the generating polynomial are reversed in comparison with Equation 2. This also means that the sequences generated by Equation 2 are reversed in order. In this case, it is said that the two Equations are in a reverse relationship. The reverse relationship is also satisfied when a degree of a polynomial is reversed (herein, the degree of the polynomial is modified to n-k). When using the m-sequences, the polynomial can be selected to satisfy the reverse relationship.

For example, if n=5, the polynomial for generating the m-sequences can be expressed as shown (1) $x^5+x^2+1$ (2) $x^5+x^3+1$ (3) $x^5+x^3+x^2+x^1+1$ (4) $x^5+x^4+x^3+x^2+1$ (5) $x^5+x^4+x^2+x^1+1$ (6) $x^5+x^4+x^3+x^1+1$     [Equation 4]

In this case, (1) and (2), (3) and (4), and (5) and (6) are in a pair relationship which satisfies the reverse relationship expressed by Equations 2 and 3. The m-sequences can be selected to satisfy the reverse relationship.

When a significantly long sequence is used, the sequence may be divided into several pieces by differently determining a start offset of the sequence. In this case, each piece of sequence can be used in a reverse order.

In addition, when the significantly long sequence is used, the long sequence may be reversed, and then the reversed sequence can be divided into several pieces by differently determining a start offset of the sequence.

The aforementioned sequence can be used in several channels. The greater the number of available sequences, the higher the capacity of UEs.

In an embodiment, the aforementioned sequence is used in a synchronization signal. Further, the sequence is used in a primary synchronization code (PSC) for a primary synchronization signal (PSS) or in a secondary synchronization code (SSC) for a secondary synchronization signal (SSS). Furthermore, the sequence is used in a scrambling code. In this case, the sequence can be selected so that the SSC and the scramble code satisfy a reverse relationship.

In another embodiment, the aforementioned sequence is used in a random access preamble. The random access preamble is used for request of uplink radio resources. One sequence index corresponds to one opportunity. A UE randomly selects any one of sequence sets and thus informs a BS of the existence of the UE, or performs an operation such as scheduling request or bandwidth request. A random access procedure is a contention-based procedure. Thus, collision may occur among UEs. To reduce the collision among the UEs in the random access procedure, the number of random access preambles in the set needs to be large enough. For example, if the random access preambles are configured by using Equation 1, there are 31 opportunities. If the random access preambles are configured by using the definition of the sequence S3, there are 62 opportunities.

In still another embodiment, the aforementioned sequence can be used to transmit a channel quality indicator (CQI) or an acknowledgment (ACK)/negative-acknowledgement (NACK) signal. When the sequence of Equation 1 is used, a total of 31 CQI or ACK/NACK signal (>4 bits) can be transmitted. When the sequence S3 is used, a total of 62 CQI or ACK/NACK signal (>5 bits) can be transmitted.

In still another embodiment, the aforementioned sequence can be used to a base sequence for a reference signal. The reference signal may be classified into a demodulation reference signal for data demodulation or a sounding reference signal for uplink scheduling. The reference signal needs to have a large number of available sequences to facilitate cell planning and coordination. For example, assume that a total of 170 sequences are required as a downlink reference signal. Then, when a bandwidth of 1.25 MHz is used as a reference, the number of subcarriers occupied by the reference signal is 120 within an OFDM symbol length of 5 ms. If an m-sequence is used, a total of 127 sequences can be generated by using a 7-th degree polynomial. When using the sequence S3, a total of 252 sequences can be generated. Assume that the uplink reference signal is assigned to one resource block including 12 subcarriers. Then, when the m-sequence is used, a total of 15 sequences can be generated by using a 4-th degree polynomial. When using the sequence S3, a total of 30 sequences can be generated.

II. Synchronization Signal

Now, a synchronization signal will be described. Technical features of the present invention can be easily applied to a random access preamble or other control signals by those ordinary skilled in the art.

Figure 2:
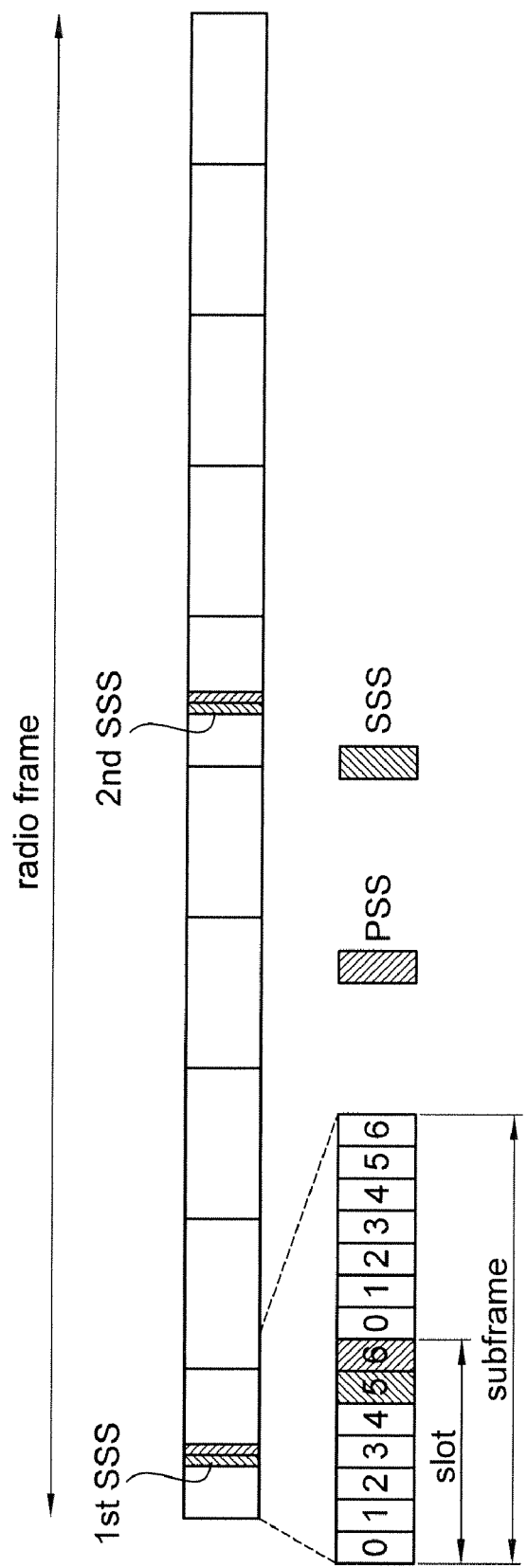
FIG. 2 shows an example of a radio frame structure.

FIG. 2 shows an example of a radio frame structure.

Referring to FIG. 2, a radio frame includes 10 sub-frames. One sub-frame includes two slots. One slot includes a plurality of OFDM symbols in time domain. Although one slot includes 7 OFDM symbols in FIG. 2, the number of OFDM symbols included in one slot may vary depending on a cyclic prefix (CP) structure.

The radio frame structure is for exemplary purposes only. Thus, the number of sub-frames and the number of slots included in each sub-frame may vary in various ways.

A primary synchronization signal (PSS) is transmitted in last OFDM symbol in each of a 0-th slot and a 10-th slot. The same PSC is used by two PSSs. The PSS is used to acquire OFDM symbol synchronization (or slot synchronization) and is associated with a unique identity in a cell identity group. The PSC may be generated from a Zadoff-Chu (ZC) sequence. At least one PSC exists in a wireless communication system.

The PSS comprise a primary synchronization code (PSC). When three PSCs are reserved, a BS selects one of the three PSCs, and transmits the selected PSC in the last OFDM symbols of the 0-th slot and the 10-th slot as the PSS.

A secondary synchronization signal (SSS) is transmitted in OFDM symbol which is immediately previously located from the OFDM symbol for the PSS. This means that the SSS and the PSS are transmitted in contiguous (or consecutive) OFDM symbols. The SSS is used to acquire frame synchronization and is associated with a cell identity group. The cell identity can uniquely defined by the cell identity group acquired from the SSS and the unique identity acquired from the PSS. The UE can acquire the cell identity by using the PSS and the SSS.

One SSS comprises two secondary synchronization codes (SSCs). One SSC may use a PN sequence (i.e., m-sequence). For example, if one SSS includes 64 subcarriers, two PN sequences having a length of 31 are mapped to the one SSS.

A location or the number of OFDM symbols in which the PSS and the SSS are arranged over a slot is shown in FIG. 2 for exemplary purposes only, and thus may vary depending on a system.

Figure 3:
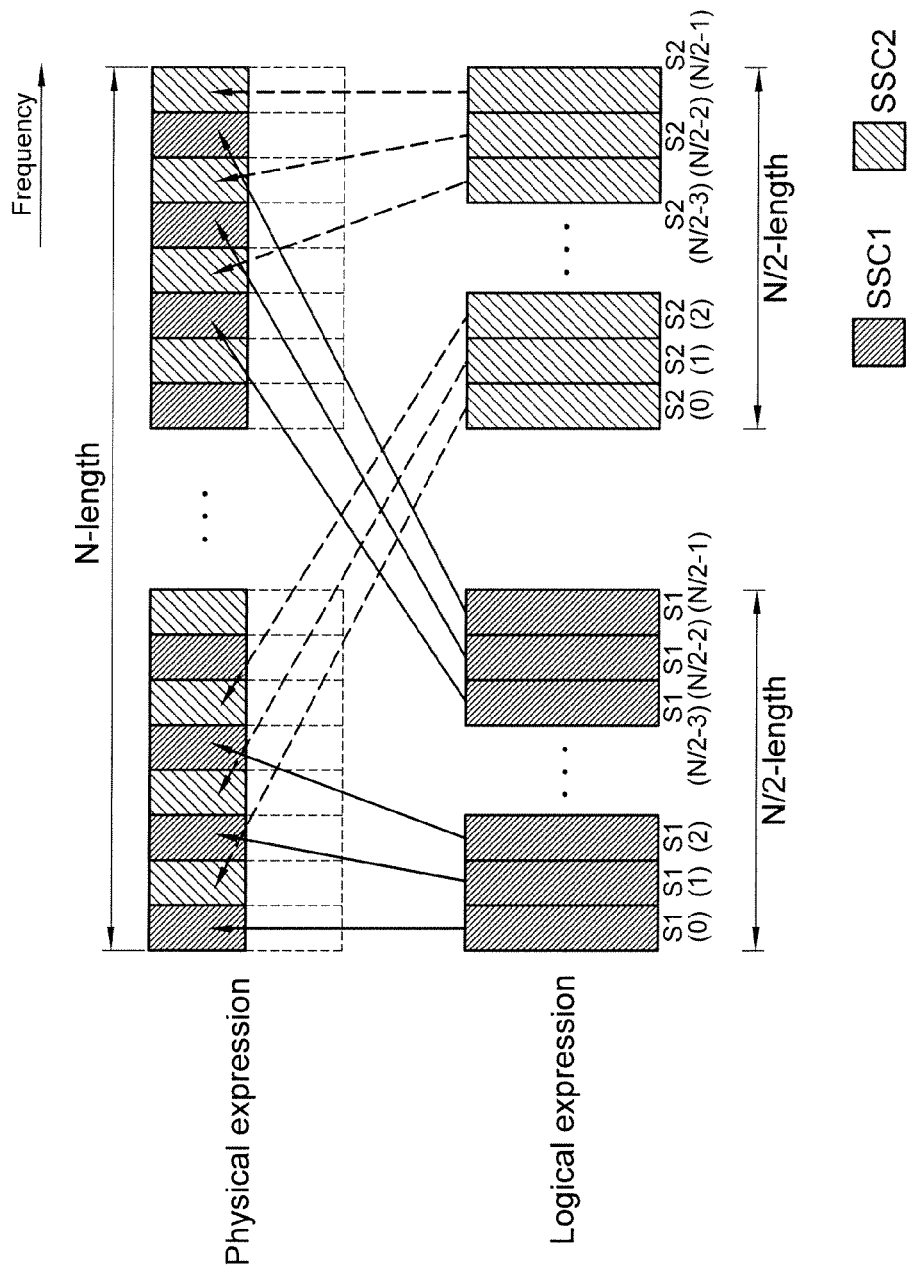
FIG. 3 shows an example of physical mapping of two SSCs onto a SSS.

FIG. 3 shows an example of physical mapping of two SSCs onto a SSS.

Referring to FIG. 3, if the number of subcarriers included in the SSS is N, a length of a first SSC SSC1 and a length of a second SSC SSC2 are N/2. A logical expression indicates an SSC in use. A physical expression indicates subcarriers to which an SSC is mapped when the SSC is transmitted in the SSS. S1(n) denotes an n-th element of the first SSC SSC1. S2(n) denotes an n-th element of the second SSC SSC2. The first SSC SSC1 and the second SSC SSC2 are interleaved to each other, and are mapped to physical subcarriers in a comb-type configuration. Such a mapping method is referred to as distributed mapping.

Figure 4:
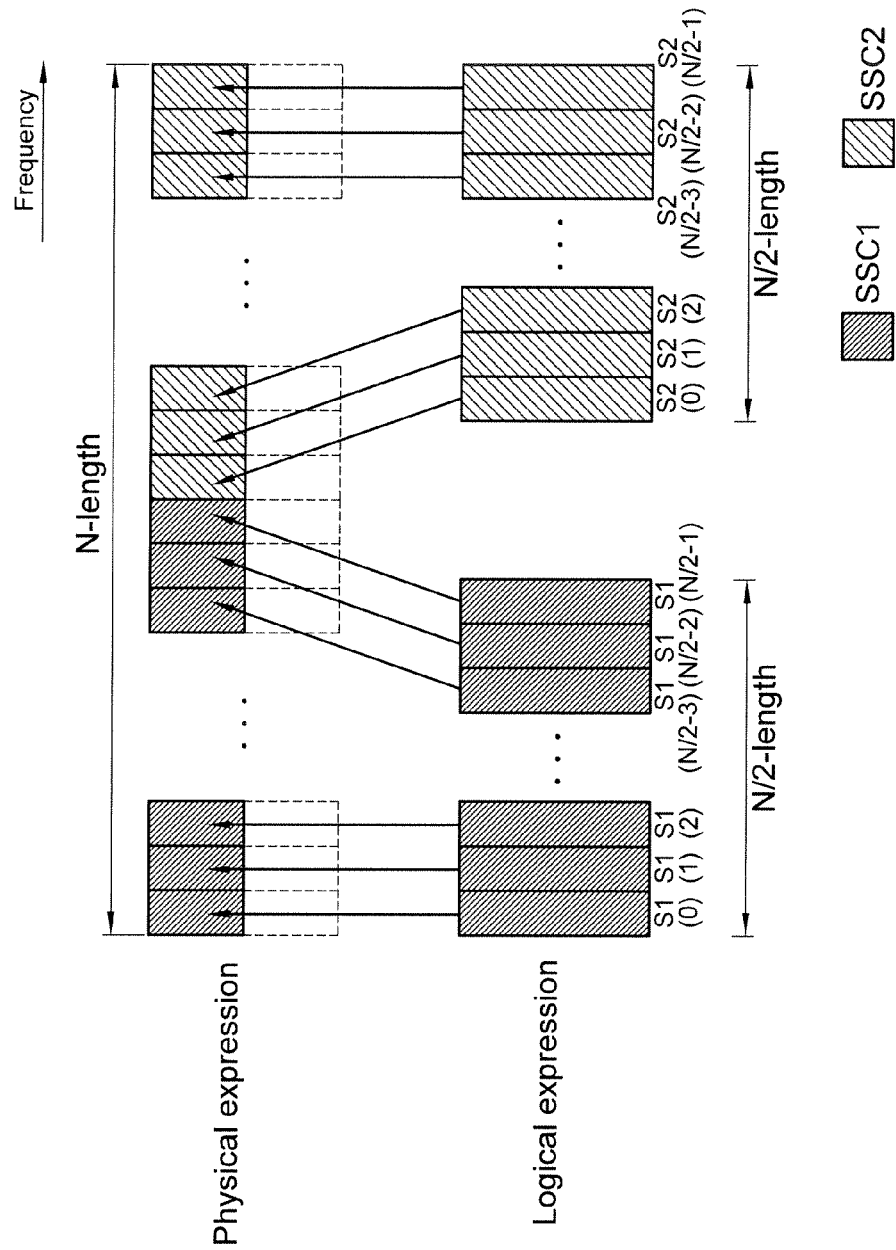
FIG. 4 shows another example of physical mapping of two SSCs onto a SSS.

FIG. 4 shows another example of physical mapping of two SSCs onto a SSS.

Referring to FIG. 4, the number of subcarriers included in the SSS is N. A length of a first SSC SSC1 and a length of a second SSC SSC2 are N/2. A logical expression indicates an SSC in use. A physical expression indicates subcarriers to which an SSC is mapped when the SSC is transmitted in the SSS. S1(n) denotes an n-th entity of the first SSC SSC1. S2(n) denotes an n-th entity of the second SSC SSC2. The first SSC SSC1 and the second SSC SSC2 are mapped to locally concentrated physical subcarriers. Such a mapping method is referred to as localized mapping.

If the number of subcarriers in the SSS is 62, and the length of the PN code is 31, then one SSC has a total of 31 indices. If the first SSC SSC1 can have indices 0 to 30, and the second SSC SSC2 can have indices 0 to 30, then a total of 961 (i.e., 31×31=961) pieces of information can be delivered.

III. Mapping of SSC onto SSS

Figure 5:
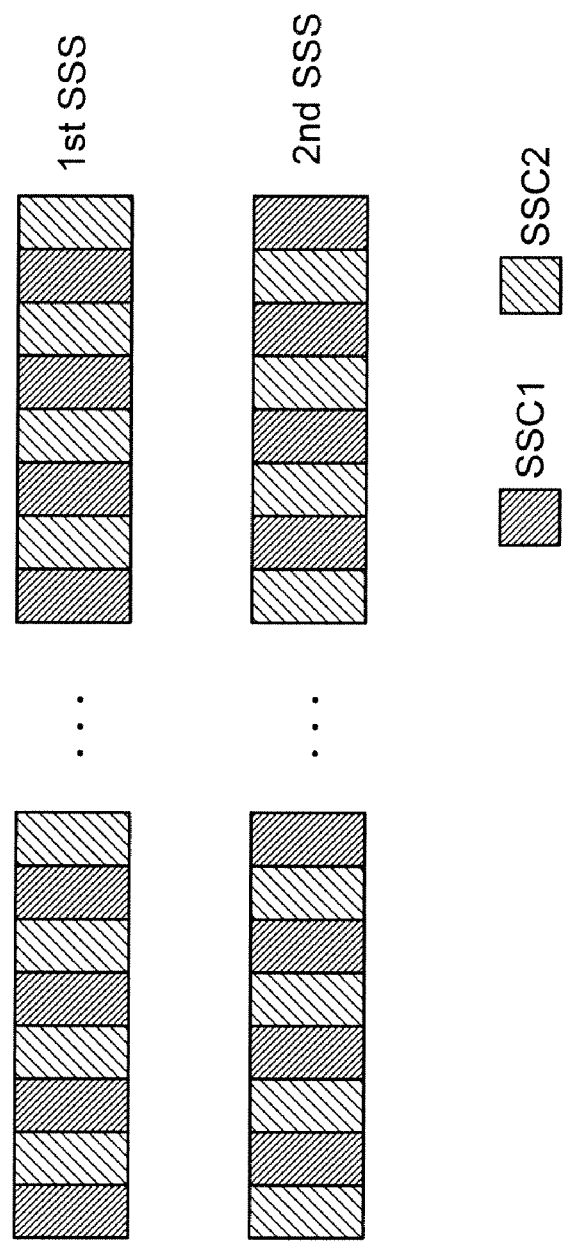
FIG. 5 shows an example of mapping of two SSCs onto a SSS.

FIG. 5 shows an example of mapping of two SSCs onto a SSS.

Referring to FIG. 5, since two SSSs are transmitted in a radio frame as shown in FIG. 2, a first SSS assigned to a 0-th slot and a second SSS assigned to a 10-th slot both use a combination of a first SSC SSC1 and a second SSC SSC2. In this case, locations of the first SSC SSC1 and the second SSC SSC2 are swapped with each other in frequency domain. That is, when a combination of (SSC1, SSC2) is used in the first SSS, the second SSS swaps the first SSC SSC1 and the second SSC SSC2 with each other and thus uses a combination of (SSC2, SSC1).

To detect the SSSs, an interval between the first SSS and the second SSS can be predetermined. Multi-frame averaging can be performed according to the CP structure. The multi-frame averaging is an operation in which a plurality of SSSs are received by using a plurality of radio frames and then values acquired from the respective SSSs are averaged. If the CP structure is not known, the multi-frame averaging is performed for all CP structures. A structure of swapping SSCs is advantageous when a receiver detects the SSSs by performing the multi-frame averaging. In this structure, the first SSS and the second SSS use the same combination of SSCs, and there is no change except for the locations of the SSCs. Thus, when the averaging is performed, the second SSS simply swaps and integrates the SSCs. On the other hand, when a structure of not swapping SSCs is used, even if coherent detection is performed using a PSS, non-coherent combining has to be performed when the detection results are averaged. However, when the coherent detection using the PSS is performed, performance improvement can be expected since optimal maximal ratio combining (MRC), i.e., coherent combining, can be performed when the SSCs are integrated. It is well-known that the MRC is the optimal combining. In general, there is a gain of about SNR of 3 dB in the coherent combining over the non-coherent combining.

Although the first SSC SSC1 and the second SSC SSC2 are swapped in the first SSS and the second SSS in the frequency domain, this is for exemplary purposes only. Thus, the first SSC SSC1 and the second SSC SSC2 may be swapped in time domain or code domain.

Figure 6:
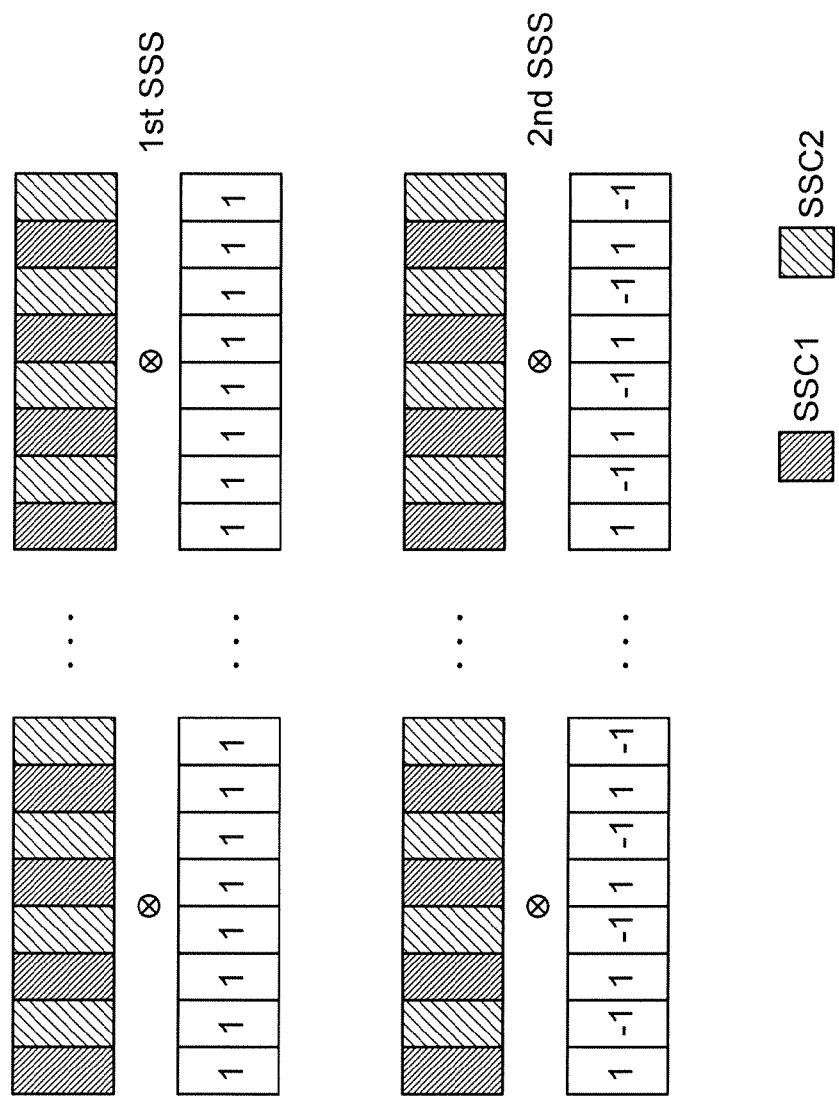
FIG. 6 shows another example of mapping of two SSCs onto a SSS.

FIG. 6 shows another example of mapping of two SSCs onto a SSS. Herein, binary phase shift keying (BPSK) modulation is used. The BPSK modulation is M-phase shift keying (PSK) modulations when M=2. In the BPSK modulation, the whole or some parts of a channel are modulated into +1 or −1. By using the M-PSK modulation, additional information can be carried without having an effect on detection performance of a sequence currently being used.

Referring to FIG. 6, a first SSS and a second SSS both use a combination of a first SSC SSC1 and a second SSC SSC2, modulate the whole parts of the first SSS into +1, modulate a first SSC SSC1 of the second SSS into +1, and modulate a second SSC SSC2 of the second SSS into −1. That is, modulation can be performed by changing phases between SSCs used in one SCH, or can be performed by changing phases between two SCHs. This is called differential modulation.

In general, to detect sequences which have undergone modulation, a signal (i.e., a reference signal or a PSC) is required for a phase reference. That is, coherence detection is required. However, when the differential modulation is performed to identify a frame boundary within one SSS, both the coherent detection and the non-coherent detection are possible.

IV. Scrambling of SSS

Now, scrambling of a SSS by using a scrambling code associated with a PSC will be described.

The SSS is scrambled by using the scrambling code. The scrambling code is a binary sequence associated with the PSC and is one-to-one mapped to the PSC. In other words, the scrambling code depends on the PSC.

The scrambling of the SSS is used to solve ambiguity resulted from SSC detection. For example, assume that an SSC combination used in a SSS of a cell A is (SSC1, SSC2)=(a,b), and an SSC combination used in a SSS of a cell B is (SSC1, SSC2)=(c,d). In this case, if a UE belonging to the cell A acquires a wrong SSC combination, that is, (SSC1, SSC2)=(a,d), this is called ambiguity. That is, after the UE detects a PSS, the scrambling code is used to facilitate distinction of the SSS corresponding to the cell of the UE.

Figure 7:
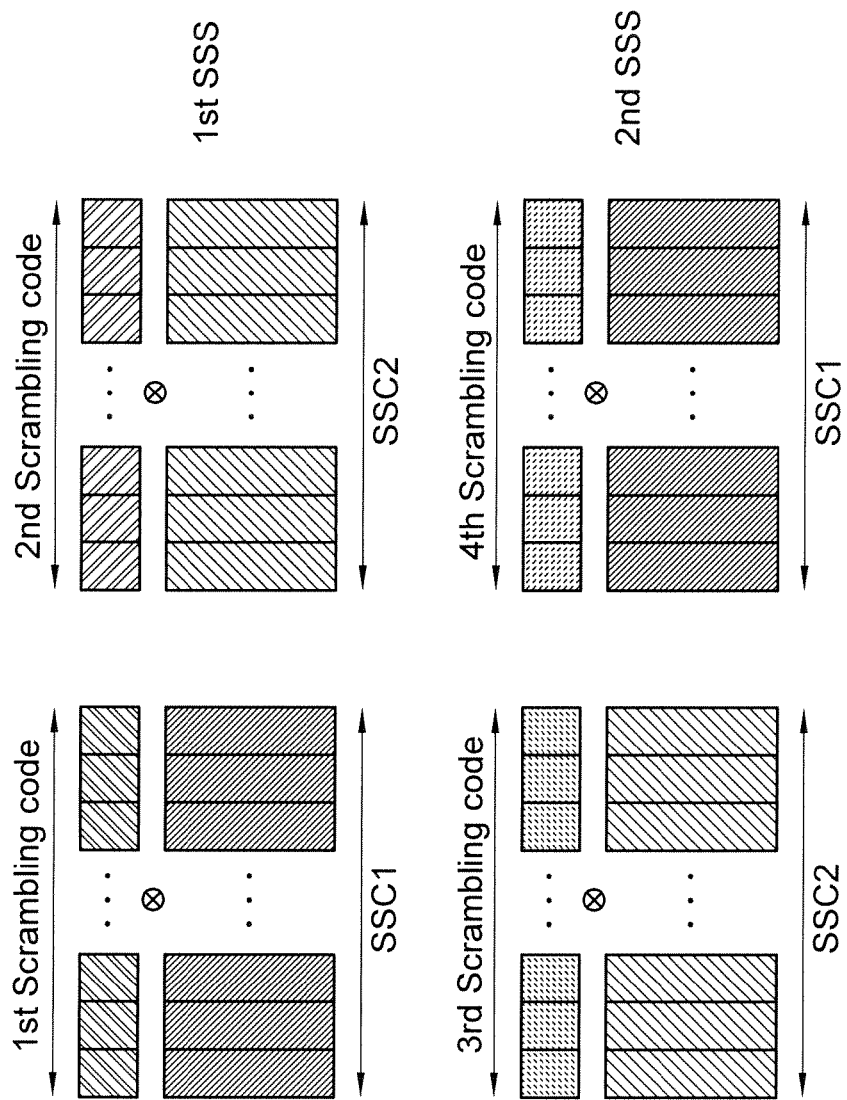
FIG. 7 shows a SSS structure according to an embodiment of the present invention.

FIG. 7 shows a SSS structure according to an embodiment of the present invention.

Referring to FIG. 7, a first SSS and a second SSS both use a combination of a first SSC SSC1 and a second SSC SSC2. In this case, locations of the first SSC SSC1 and the second SSC SSC2 are swapped in frequency domain. That is, when a combination of (SSC1, SSC2) is used in the first SSS, the second SSS swaps the first SSC SSC1 and the second SSC SSC2 with each other and thus uses a combination of (SSC2, SSC1).

The SSCs of the respective SSSs are scrambled by using different scrambling codes. The first SSC SSC1 of the first SSS is scrambled by a first scrambling code. The second SSC SSC2 of the first SSS is scrambled by a second scrambling code. The second SSC SSC2 of the second SSS is scrambled by a third scrambling code. The first SSC SSC1 of the second SSS is scrambled by a fourth scrambling code.

Since each SSC is scrambled by a different scrambling code, an interference averaging effect can be achieved. For example, assume that an SSC combination of the first SSS of a cell A is (SSC1_A, SSC2_A)=(a, b), a SSC combination of the second SSS of the cell A is (SSC2_A, SSC1_A)=(b, a), a SSC combination of the first SSS of a cell B is (SSC1_B, SSC2_B)=(c, d), a SSC combination of the second SSS is (SSC2_B, SSC1_B)=(d, c), the cell A is a cell where a UE is currently located (that is, the cell A is a cell to be detected), and the cell B is a neighbor cell (that is, the cell B is a cell which acts as interference). Then, interference of SSC1_A and interference of SSC2_A are c and d and thus become equal irrespective of the first SSS and the second SSS. Therefore, the interference averaging effect cannot be achieved. However, when each SSC is scrambled by using a different scrambling code, the interference averaging effect can be achieved due to an interference effect of different codes.

Therefore, since different scrambling codes are used for the same SSC for each sub-frame, ambiguity resulting from SSC detection can be reduced. Further, the interference averaging effect can be achieved when multi-frame averaging is performed.

Herein, the SSC structure represents a logical structure. When mapping is performed on physical subcarriers, distributed mapping or localized mapping may be used. In addition, physical mapping may be performed before or after scrambling is performed in the logical structure.

Figure 8:
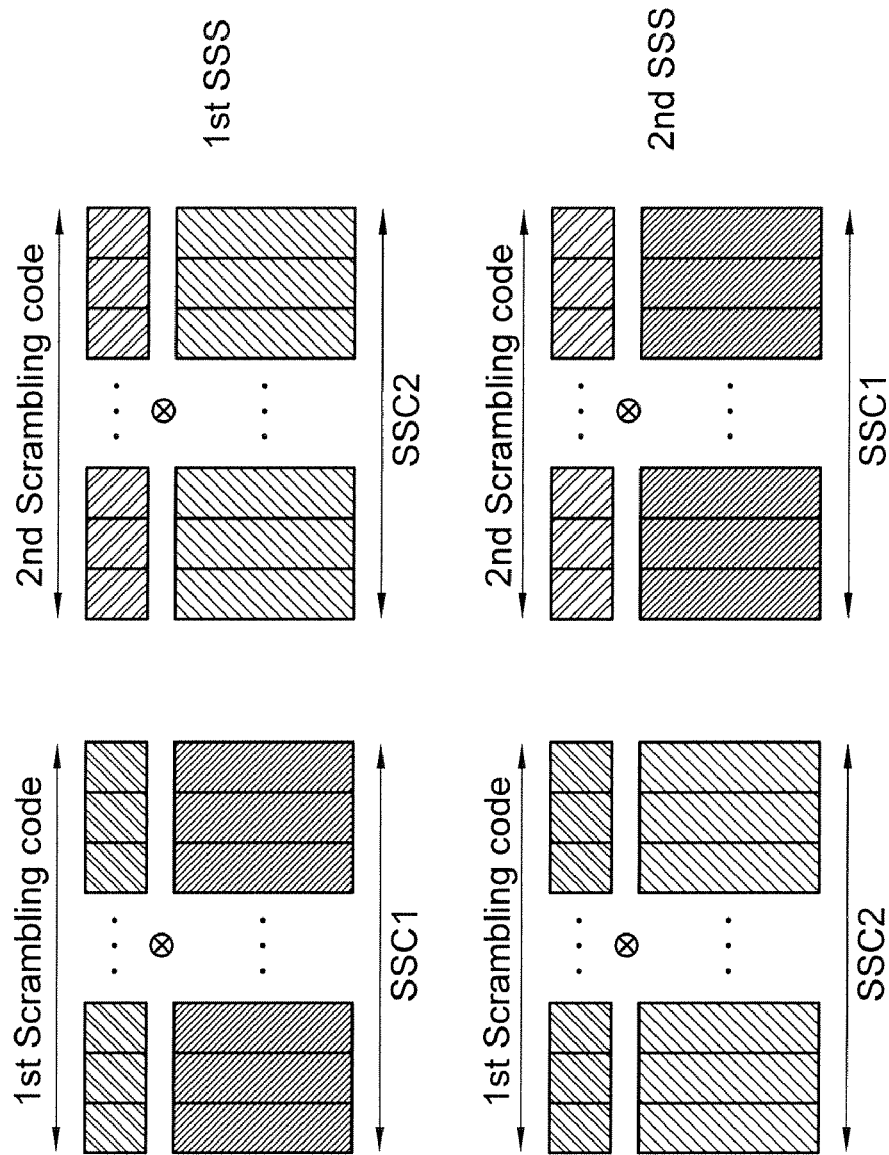
FIG. 8 shows a SSS structure according to another embodiment of the present invention.

FIG. 8 shows a SSS structure according to another embodiment of the present invention.

Referring to FIG. 8, a first SSS and a second SSS both use a combination of a first SSC SSC1 and a second SSC SSC2. In this case, locations of the first SSC SSC1 and the second SSC SSC2 are swapped in frequency domain. That is, when a combination of (SSC1, SSC2) is used in the first SSS, the second SSS swaps the first SSC SSC1 and the second SSC SSC2 with each other and thus uses a combination of (SSC2, SSC1).

Scrambling is performed by using two scrambling codes, corresponding to the number of SSCs included in one SSS. The first SSC SSC1 of the first SSS is scrambled by a first scrambling code. The second SSC SSC2 of the first SSS is scrambled by a second scrambling code. The second SSC SSC2 of the second SSS is scrambled by the first scrambling code. The first SSC SSC1 of the second SSS is scrambled by the second scrambling code.

From the viewpoint of a physical expression in which mapping is made to actual subcarriers, two SSCs swap their locations for the first SSS and the second SSS but the locations of the scrambling codes are not swapped. From the viewpoint of a logical expression, the scrambling codes respectively applied to the first SSC SSC1 and the second SSC SSC2 have an effect so that the scrambling codes respectively applied to the second SSC SSC2 and the first SSC SSC1 of the second SSS are changed. In comparison with the embodiment of FIG. 7, the number of required scrambling codes decreases.

Figure 9:
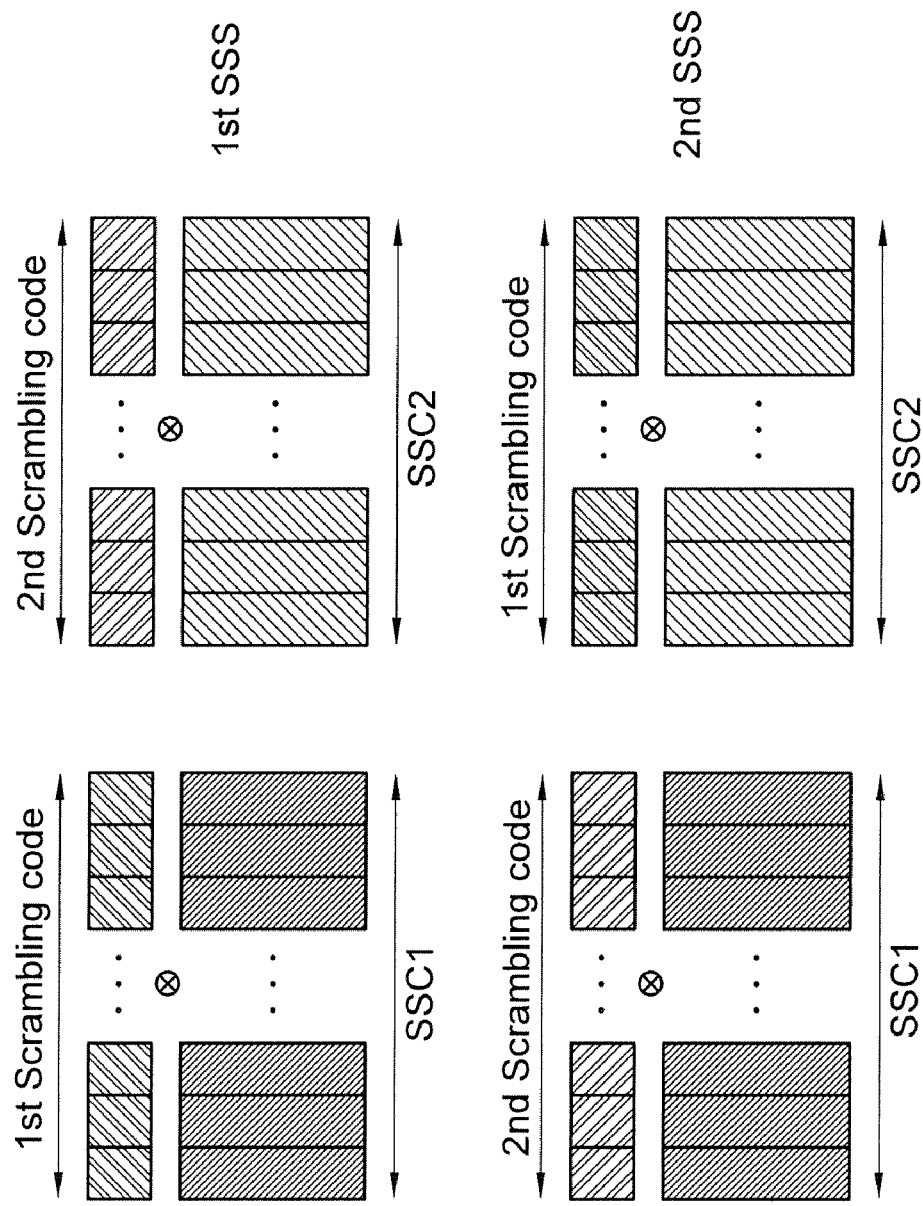
FIG. 9 shows a SSS structure according to another embodiment of the present invention.

FIG. 9 shows a SSS structure according to another embodiment of the present invention.

Referring to FIG. 9, a first SSS and a second SSS use the same combination of a first SSC SSC1 and a second SSC SSC2. That is, if the first SSS uses a combination of (SSC1, SSC2), the second SSS also uses the combination of (SSC1, SSC2). Locations of the first SSC SSC1 and the second SSC SSC2 are not swapped with each other in frequency domain. In the frequency domain, the locations of the first SSC SSC1 and the second SSC SSC2 are equal to each other in the first SSS and the second SSS.

Scrambling is performed by using two scrambling codes, corresponding to the number of SSCs included in one SSS. In this case, the locations of the scrambling codes used for the first SSS and the second SSS are swapped with each other. The first SSC SSC1 of the first SSS uses a first scrambling code. The second SSC SSC2 of the first SSS uses a second scrambling code. The second SSC SSC2 of the second SSS uses the second scrambling code. The first SSC SSC1 of the second SSS uses the first scrambling code.

Unlike the embodiment of FIG. 8, the SSCs do not swap their locations for the first SSS and the second SSS, but do swap the locations of the scrambling codes. That is, for the first SSS and the second SSS, the locations of the SSCs or the scrambling codes are swapped with each other.

Figure 10:
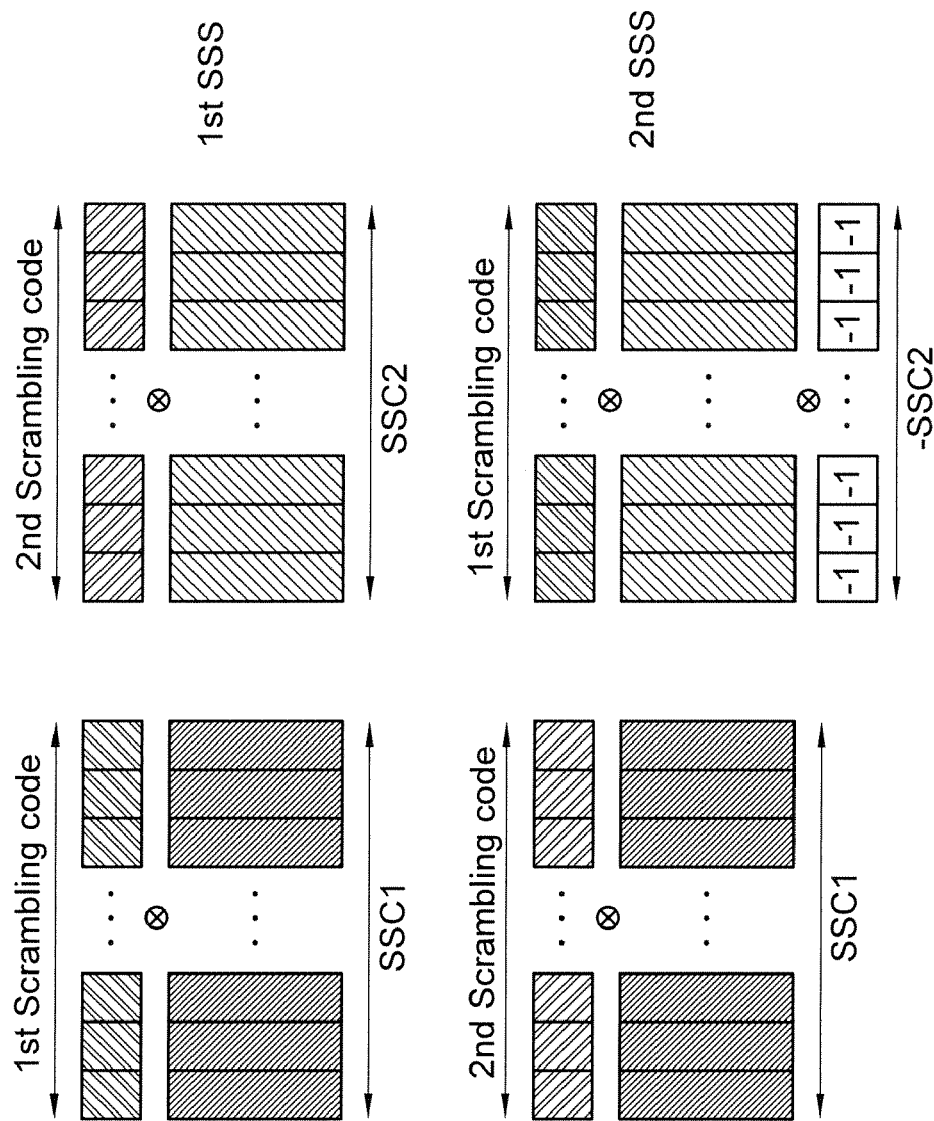
FIG. 10 shows a SSS structure according to another embodiment of the present invention.

FIG. 10 shows an SSS structure according to another embodiment of the present invention.

Referring to FIG. 10, in frequency domain, a first SSC SSC1 and a second SSC SSC2 have the same location in a first SSS and a second SSS, except that the second SSC of the second SSS is −SSC2. That is, the first SSS uses (SSC1, SSC2), and the second SSS uses (SSC1, −SSC2).

A modulation scheme used herein is BPSK modulation. A higher-order modulation scheme may also be used. For example, when Quadrature phase shift key (QPSK) modulation is used, it is possible to change a phase by performing modulation in a form of +1, −1, +j, −j. The first SSS may use (SSC1, SSC2), and the second SSS uses (SSC1, −jSSC2).

It is difficult to perform interference randomization if an SSC combination of the first SSS is equal to an SSC combination of the second SSS in a multi-cell environment. Thus, if the first SSC SSC1 and the second SSC −SSC2 are not swapped with each other, scrambling codes are swapped with each other. In this case, differential modulation information of the first SSC SSC1 and the second SSC −SSC2 in the second SSS can represent frame boundary information. Therefore, in order to detect 392 (=14×14×2) signals, a detection operation is performed 392 times when differential modulation is not performed. On the other hand, when the differential modulation is performed, the detection operation is performed 196 (=14×14) times, and two pieces of information can be detected by using the differential modulation. An overall detection performance is determined by the detection operation performed 196 times rather than the differential modulation. Thus, the overall performance can be further improved when the differential modulation is performed. In addition, since the first SSS and the second SSS both use the same first and second scrambling codes SSC1 and SSC2, MRC combination can be performed.

Although differential modulation is used for the second SSC −SSC2 of the second SSS, this is for exemplary purposes only. For example, the first SSS may use (SSC1, SSC2), and the second SSS may use (−SSC1, −SSC2). The first SSS may use (SSC1, SSC2), and the second SSS may use (−SSC1, SSC2). The first SSS may use (−SSC1, SSC2), and the second SSS may use (SSC1, −SSC2). The first SSS may use (SSC1, −SSC2), and the second SSS may use (−SSC1, SSC2). The first SSS may use (−SSC1, −SSC2), and the second SSS may use (SSC1, SSC2). The first SSS may use (SSC1, −SSC2), and the second SSS may use (SSC1, SSC2). The first SSS may use (−SSC1, SSC2), and the second SSS may use (SSC1, SSC2). In addition thereto, various other modulation combinations may also be used.

Figure 11:
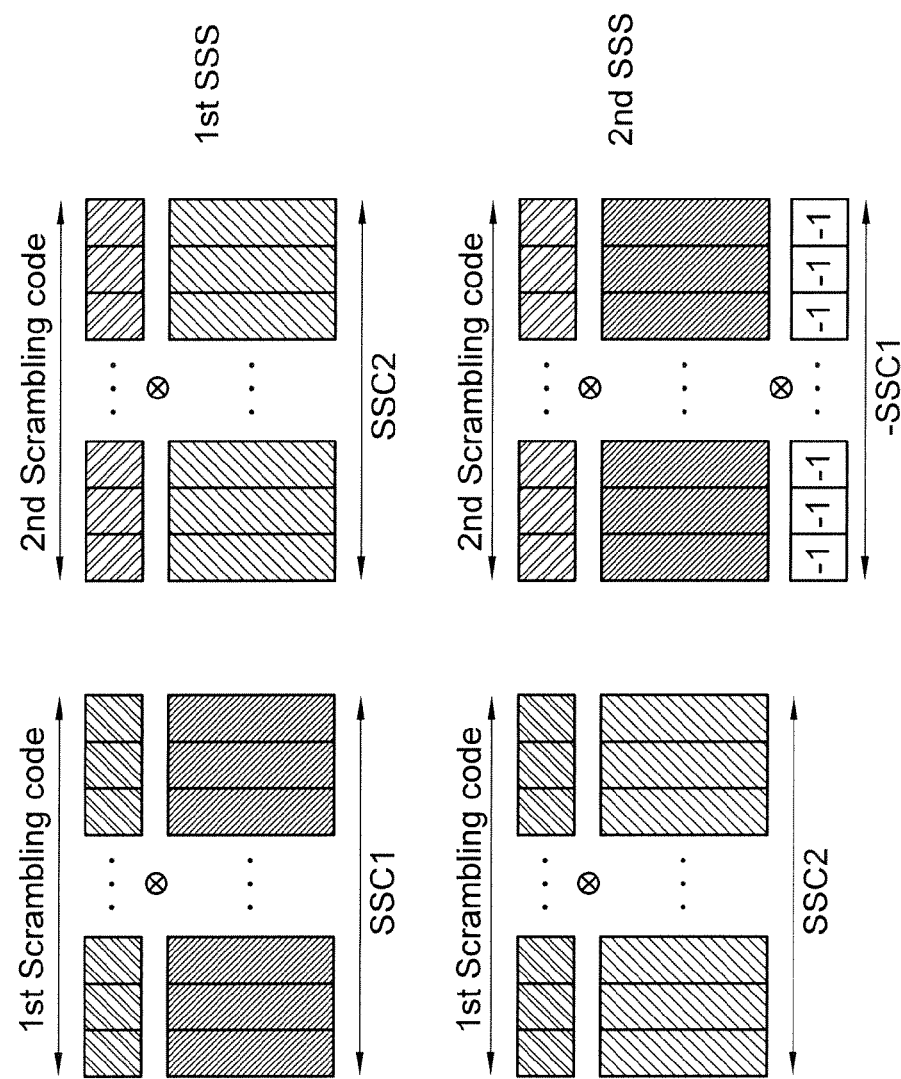
FIG. 11 shows a SSS structure according to another embodiment of the present invention.

FIG. 11 shows an SSS structure according to another embodiment of the present invention.

Referring to FIG. 11, a first SSS and a second SSS both use a combination of a first SSC SSC1 and a second SSC SSC2. In this case, locations of the first SSC SSC1 and the second SSC SSC2 are swapped in a frequency domain. That is, when a combination of (SSC1, SSC2) is used in the first SSS, the second SSS swaps the first SSC SSC1 and the second SSC SSC2 with each other and thus uses a combination of (SSC2, SSC1). The first SSC of the second SSS is differential-modulated into −SSC1. That is, the first SSS uses (SSC1, SSC2), and the second SSS uses (SSC2, −SSC1).

V. Scrambling when a Plurality of PSCs are Used

Now, an example of configuring a scrambling code when a plurality of PSCs are used will be described. For clarity, it is assumed that three PSCs are used, and scrambling codes associated with the respective PSCs are defined as Px-a1, Px-a2, Px-b1, and Px-b2, respectively. Herein, 'x' denotes a PSC index, 'a' denotes a first SSS, 'b' denotes a second SSS, '1' denotes a first SSC SSC1, and '2' denotes a second SSC SSC2. That is, P1-a1 denotes a scrambling code associated with a first PSC and used in the first SSC SSC1 of the first SSS, P2-b2 denotes a scrambling code associated with a second PSC and used in the second SSC SSC2 of the second SSS, P3-a1 denotes a scrambling code associated with a third PSC and used in the first SSC SSC1 of the first SSS. When it is said that a scrambling code is associated with a PSC, it means that the scrambling code is generated differently according to the PSC. For example, the scrambling code may be generated by using a different cyclic shift according to a cell identifier (ID) using the PSC.

<In Case of Using 6 Scrambling Codes for 3 PSCs>

For each PSC, scrambling codes may be configured such as (Px-a1, Px-a2)=(Px-b1, Px-b2). (Px-a1, Px-a2) is one-to-one mapped to the respective PSCs. That is, for the three PSCs, six scrambling codes can be defined as follows.

PSC 1->(P1-a1,P1-a2)

PSC 2->(P2-a1,P2-a2)

PSC 3->(P3-a1,P3-a2)

Figure 12:
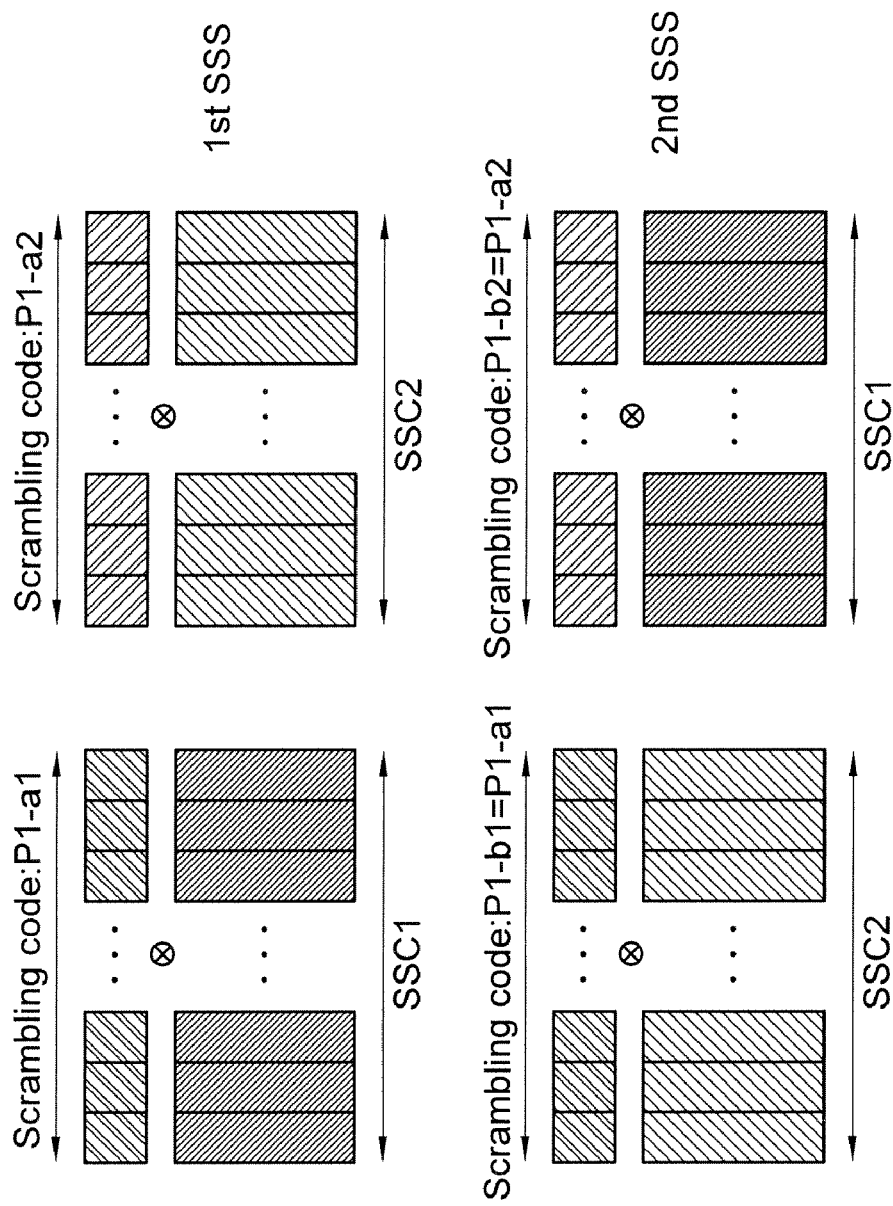
FIG. 12 shows a SSS structure for a PSC 1.
Figure 13:
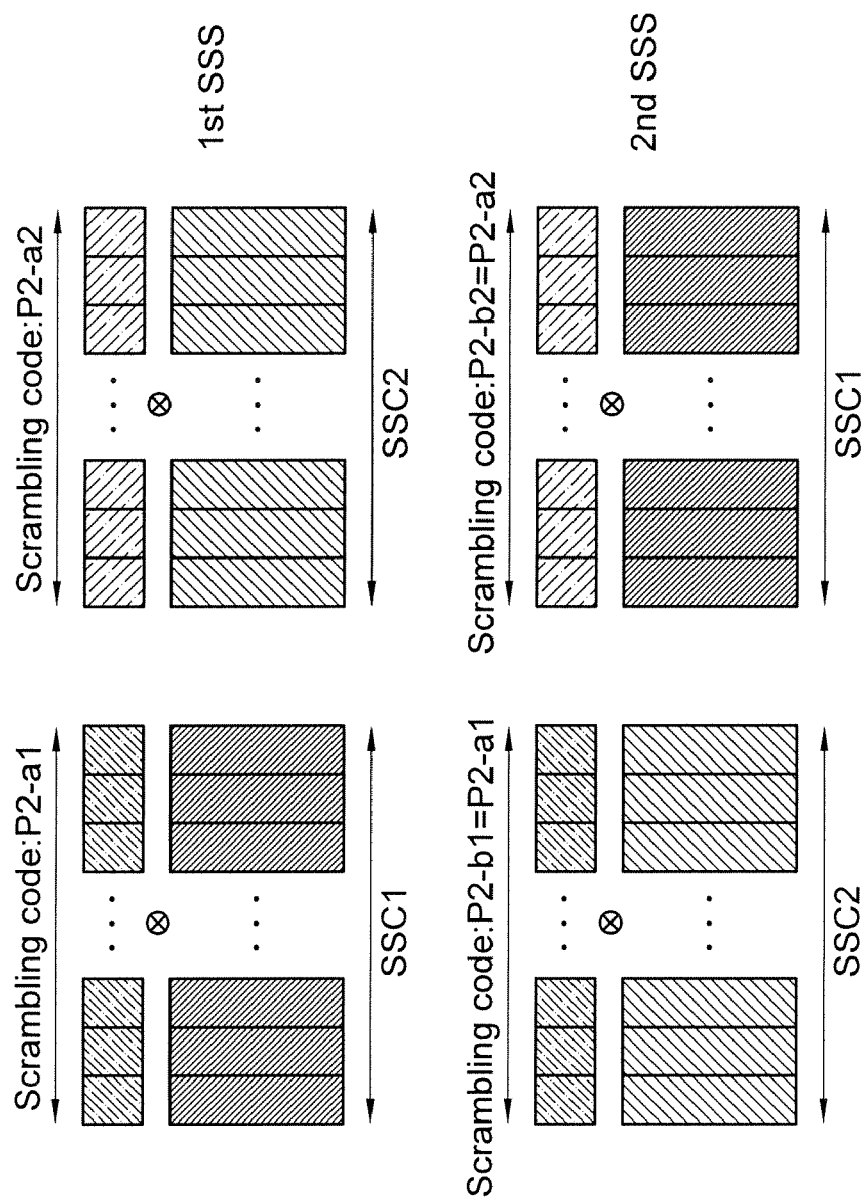
FIG. 13 shows a SSS structure for a PSC 2.
Figure 14:
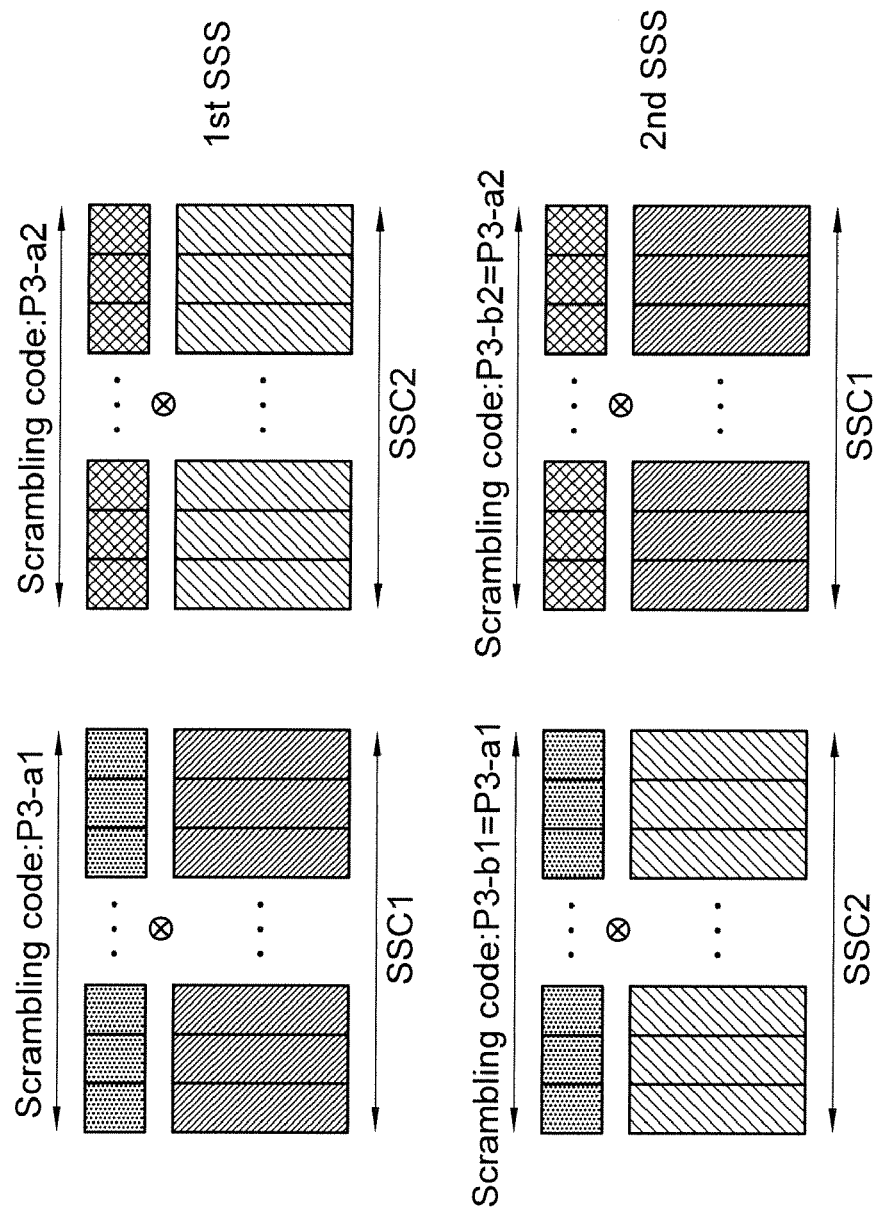
FIG. 14 shows a SSS structure for a PSC 3.

FIG. 12 shows a SSS structure for a PSC 1. FIG. 13 shows a SSS structure for a PSC 2. FIG. 14 shows a SSS structure for a PSC 3.

Referring to FIGS. 12 to 14, for each PSC, a first SSS and a second SSS both use a combination of a first SSC SSC1 and a second SSC SSC2. In this case, locations of the first SSC SSC1 and the second SSC SSC2 are swapped. That is, if the first SSS uses a combination of (SSC1, SSC2), the second SSS swaps the first SSC SSC1 and the second SSC SSC2 with each other and thus uses a combination of (SSC2, SSC1).

Scrambling is performed by using two scrambling codes, corresponding to the number of SSCs included in one SSS.

In the PSC 1 of FIG. 12, the first SSC SSC1 of the first SSS uses a scrambling code P1-a1, the second SSC SSC2 of the first SSS uses a scrambling code P1-a2, the second SSC SSC2 of the second SSS uses a scrambling code P1-a1, and the first SSC SSC1 of the second SSS uses a scrambling code P1-a2.

In the PSC 2 of FIG. 13, the first SSC SSC1 of the first SSS uses a scrambling code P2-a1, the second SSC SSC2 of the first SSS uses a scrambling code P2-a2, the second SSC SSC2 of the second SSS uses a scrambling code P2-a1, and the first SSC SSC1 of the second SSS uses a scrambling code P2-a2.

In the PSC 3 of FIG. 14, the first SSC SSC1 of the first SSS uses a scrambling code P3-a1, the second SSC SSC2 of the first SSS uses a scrambling code P3-a2, the second SSC SSC2 of the second SSS uses a scrambling code P3-a1, and the first SSC SSC1 of the second SSS uses a scrambling code P3-a2.

When mapping is performed on a physical channel, the two SSCs swap their locations for the first SSS and the second SSS, but do not swap locations of the scrambling codes.

In this method, scrambling codes associated with three PSCs are different from one another with respect to both the first SSC SSC1 and the second SSC SSC2. This can reduce ambiguity and also bring an interference randomization effect. For example, assume that an SSC combination of a first SSS of a cell A is (P1-a1x̂SSC1_A, P1-a2x̂SSC2_A), an SSC combination of a second SSS of the cell A is (P1-a1x̂SSC2_A, P1-a2x̂SSC1_A), an SSC combination of a first SSS of a cell B is (P2-a1x̂SSC1_B, P2-a2x̂SSC2_B), an SSC combination of a second SSS of the cell B is (P2-a1x̂SSC2_B, P2-a2x̂SSC1_B), the cell A is a cell where a UE is currently located, and the cell B is a neighbor cell. Then, interference of the first SSS of the cell A is (P2-a1x̂SSC1_B, P2-a2x̂SSC2_B), and interference of the second SSS is (P2-a1x̂SSC2_B, P2-a2x̂SSC1_B). In practice, since a different code acts as interference to the first SSC SSC1 and the second SSC SSC2 with respect to the first SSS and the second SSS, advantages of an interference averaging effect and multi-frame averaging can be achieved without deterioration. Accordingly, detection performance on the SSSs can be improved.

<In Case of Using 3 Scrambling Codes for 3 PSCs>

For each PSC, scrambling codes may be configured such as (Px-a1, Px-a2)=(Px-b1, Px-b2). (Px-a1, Px-a2) is one-to-one mapped to the respective PSCs. One of the two scrambling codes mapped to one PSS is equal to one of scrambling codes mapped to another PSS. For example, a relationship of Px_a2=P[mod(x+1,3)+1]_a1 is maintained. Herein, 'mod' denotes modulo operation. For example, three scrambling codes for three PSCs can be defined as follows.

PSC 1->(P1-a1,P1-a2)

PSC 2->(P2-a1=P1-a2,P2-a2)

PSC 3->(P3-a1=P2-a2,P3-a2=P1-a1)

Three scrambling codes P1-a1, P1-a2, and P2-a2 are required in practice. If (P1-a1, P1-a2, P2-a2)=($a_1, a_2, a_3$), the three scrambling codes can be expressed as follows.

PSC 1->($a_1,a_2$)

PSC 2->($a_2,a_3$)

PSC 3->($a_3,a_1$)

The number of required scrambling codes can be reduced by cyclic-shifting the three scrambling codes for the respective PSCs. By reducing the number of scrambling codes, memory capacity of a BS or a UE can be saved.

If M PSCs are used, the scrambling codes can be generalized as follows.

PSC 1->($a_1,a_2$)

PSC 2->($a_2,a_3$) . . .

PSC M->($a_M,a_1$)

Figure 15:
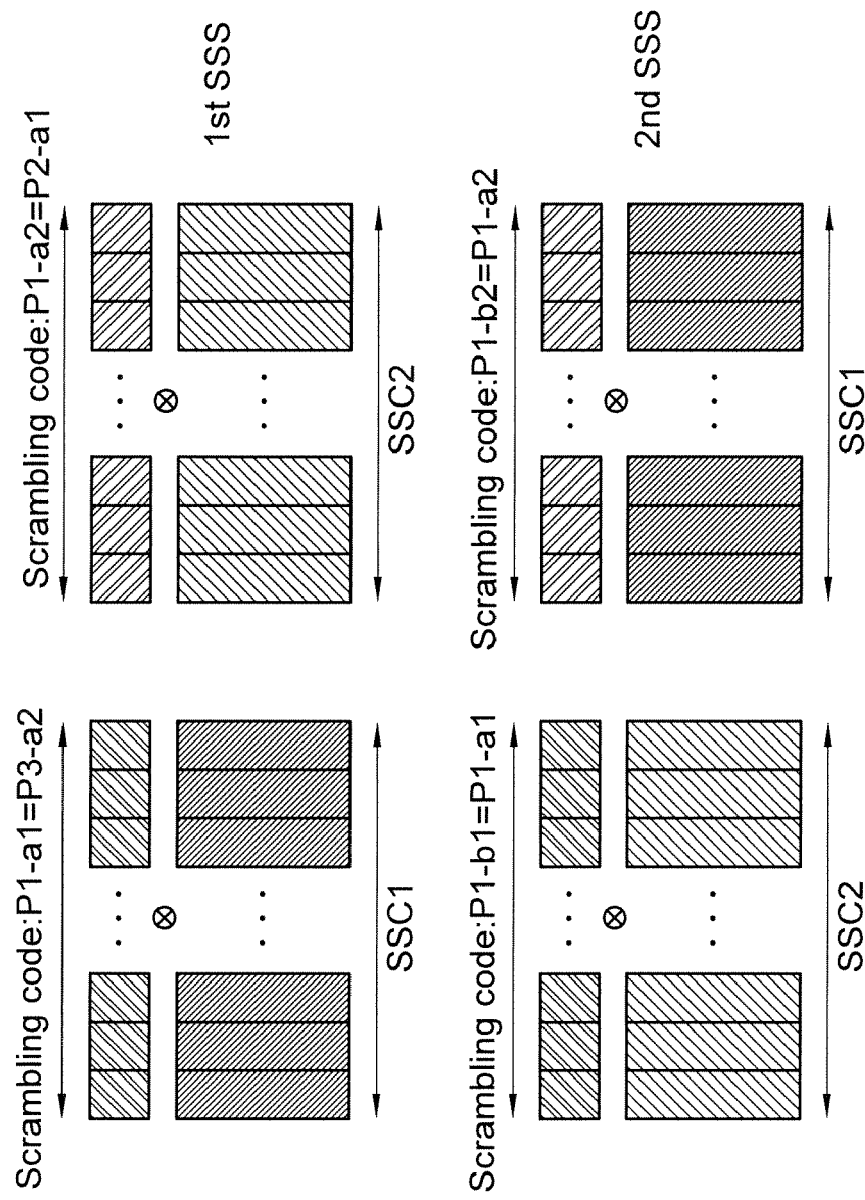
FIG. 15 shows a SSS structure for a PSC 1.
Figure 16:
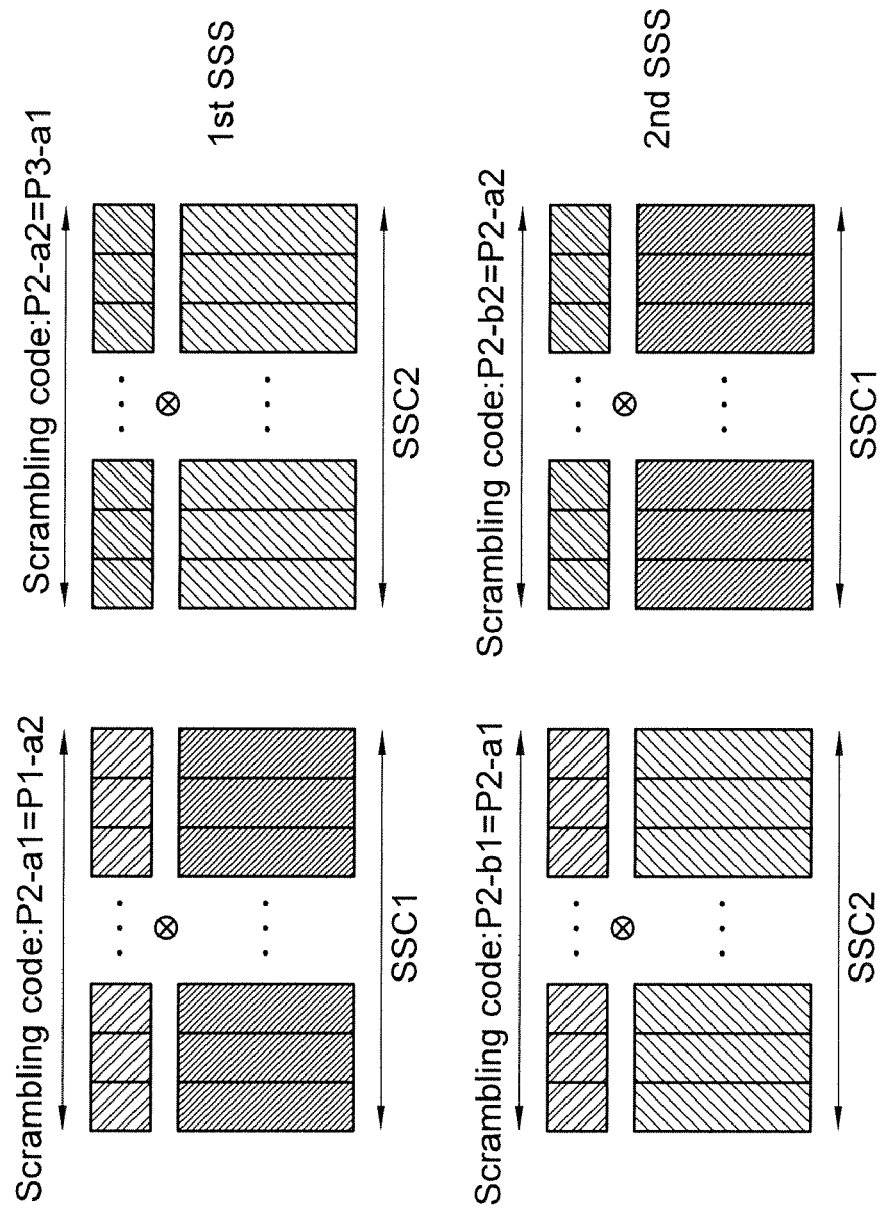
FIG. 16 shows a SSS structure for a PSC 2.
Figure 17:
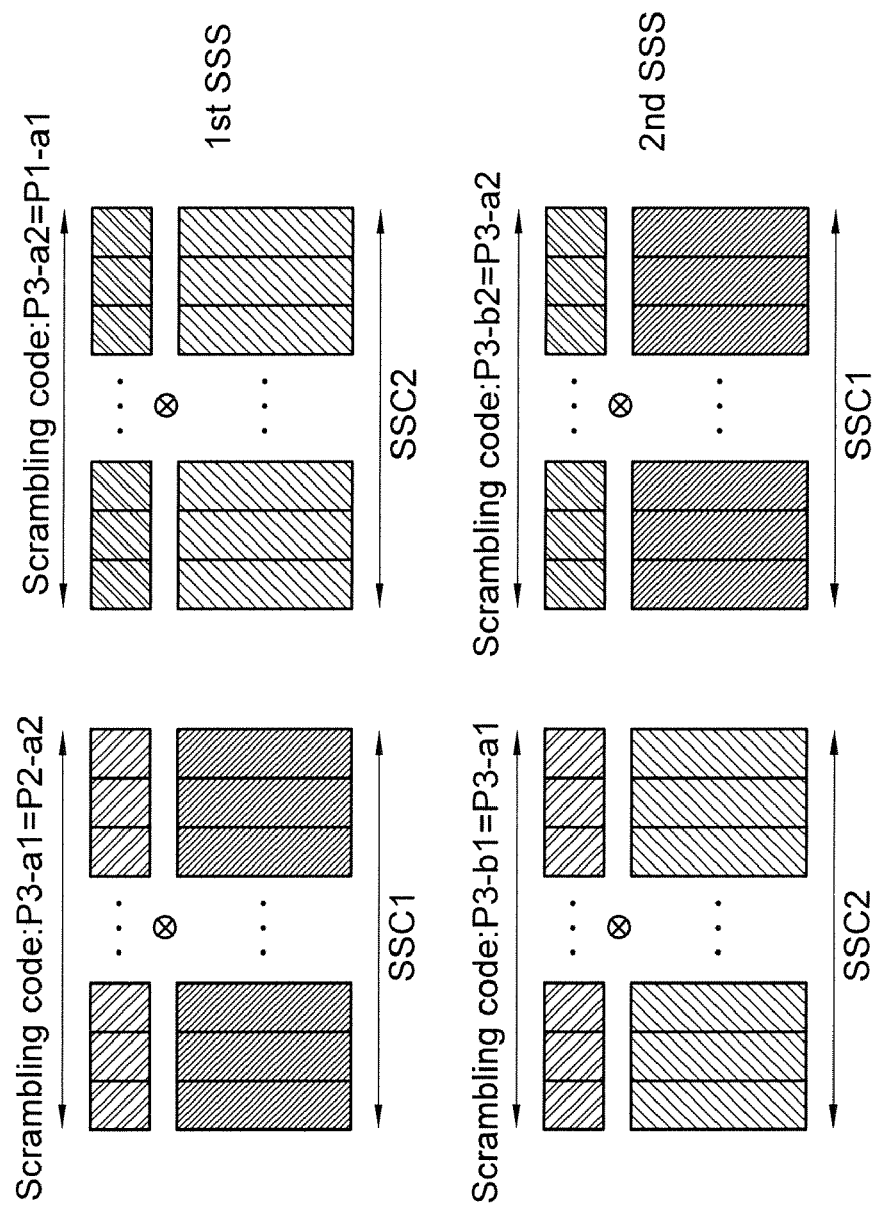
FIG. 17 shows a SSS structure for a PSC 3.

FIG. 15 shows a SSS structure for a PSC 1. FIG. 16 shows a SSS structure for a PSC 2. FIG. 17 shows a SSS structure for a PSC 3.

Referring to FIGS. 15 to 17, for each PSC, a first SSS and a second SSS both use a combination of a first SSC SSC1 and a second SSC SSC2. In this case, locations of the first SSC SSC1 and the second SSC SSC2 are swapped in a frequency domain. That is, when a combination of (SSC1, SSC2) is used in the first SSS, the second SSS swaps the first SSC SSC1 and the second SSC SSC2 with each other and thus uses a combination of (SSC2, SSC1).

Scrambling is performed by using two scrambling codes, corresponding to the number of SSCs included in one SSS.

In the PSC 1 of FIG. 15, the first SSC SSC1 of the first SSS uses a scrambling code P1-a1, the second SSC SSC2 of the first SSS uses a scrambling code P1-a2, the second SSC SSC2 of the second SSS uses a scrambling code P1-a1, and the first SSC SSC1 of the second SSS uses a scrambling code P1-a2.

In the PSC 2 of FIG. 16, the first SSC SSC1 of the first SSS uses a scrambling code P1-a2, the second SSC SSC2 of the first SSS uses a scrambling code P2-a2, the second SSC SSC2 of the second SSS uses a scrambling code P2-a1, and the first SSC SSC1 of the second SSS uses a scrambling code P2-a2.

In the PSC 3 of FIG. 17, the first SSC SSC1 of the first SSS uses a scrambling code P2-a2, the second SSC SSC2 of the first SSS uses a scrambling code P1-a1, the second SSC SSC2 of the second SSS uses a scrambling code P3-a1, and the first SSC SSC1 of the second SSS uses a scrambling code P3-a2.

From the viewpoint of physical subcarrier mapping, the two SSCs swap their locations for the first SSS and the second SSS, but do not swap locations of the scrambling codes.

In this method, scrambling codes associated with three PSCs are different from one another with respect to both the first SSC SSC1 and the second SSC SSC2. This can reduce ambiguity and also bring an interference randomization effect. For example, assume that an SSC combination of a first SSS of a cell A is (P1-a1x̂SSC1_A, P1-a2x̂SSC2_A), an SSC combination of a second SSS of the cell A is (P1-a1x̂SSC2_A, P1-a2x̂SSC1_A), an SSC combination of a first SSS of a cell B is (P1-a2x̂SSC1_B, P2-a2x̂SSC2_B), an SSC combination of a second SSS of the cell B is (P1-a2êSSC2_B, P2-a2x̂SSC1_B), the cell A is a cell where a UE is currently located, and the cell B is a neighbor cell. Then, interference of the first SSS of the cell A is (P1-a2x̂SSC1_B, P2-a2x̂SSC2_B), and interference of the second SSS is (P1-a2x̂SSC2_B, P2-a2x̂SSC1_B). In practice, since a different code acts as interference to the first SSC SSC1 and the second SSC SSC2 with respect to the first SSS and the second SSS, advantages of an interference averaging effect and multi-frame averaging can be achieved without deterioration. Accordingly, detection performance on the SSSs can be improved.

In the example described above in which six or three scrambling codes are used for three PSCs, only SSC swapping have been described to facilitate explanation. However, in addition thereto, differential modulation may be performed, and the SSC swapping may be performed in combination of the differential modulation. For example, the same may also apply to various cases, such as, in a case where the first SSS uses (SSC1, SSC2) and the second SSS uses (SSC2, SSC1), in a case where the first SSS uses (SSC1, SSC2) and the second SSS uses (SSC3, SSC4), in a case where the first SSS uses (SSC1, SSC2) and the second SSS uses (SSC1, SSC3), and a case where the first SSS uses (SSC1, SSC2) and the second SSS uses (SSC3, SSC2). When the first SSS uses (SSC1, SSC2) and the second SSS uses (SSC1, SSC3), SSC1 collision occurs. Influence resulted from the SSC collision can be reduced by swapping scrambling codes. The same also applies in a case where SSC2 collision occurs when the first SSS uses (SSC1, SSC2) and the second SSS uses (SSC3, SSC2).

VI. Method for Configuring Scrambling Codes

Any code in association with a PSC can be used as a scrambling code. Technical features of the present invention are not limited thereto.

The scrambling code may be a PN code used in a SSC.

If the number of pieces of information transmitted on a SSS is 340, the SSC can be configured in the following manner. For example, if it is assumed that a PN code having a length of 31 is used for a first SSC SSC1 and a second SSC SSC2, available code indices are 0 to 30, that is, a total of 31 indices. If the first SSC SSC1 uses indices 0 to 13, the second SSC SSC2 uses indices 14 to 27, and the first SSC SSC1 and the second SSC SSC2 can be swapped, then the number of possible combinations is 14×14×2=392. Therefore, a PN code having indices 28, 29 and 30 can be used as the scrambling code. For another example, it is possible to allow an index of the second SSC SSC2 to be always greater than an index of the first SSC SSC1. If the first SSC SSC1 has indices 0 to 17, the second SSC SSC2 has indices 1 to 18, and the first SSC SSC1 and the second SSC SSC2 can be swapped, then the number of possible combinations is $19C_2 \times 2 = 342$. Therefore, if six indices out of the remaining indices 19 to 30 are selected, six scrambling codes can be acquired. If three indices are selected, three scrambling codes can be acquired.

Now, assume that the number of pieces of information transmitted on the SSS is 680. If the index of the second SSC SSC2 is always greater than the index of the first SSC SSC1, the number of possible combinations is $27C_2 \times 2 = 702$ when the first SSC SSC1 has indices 0 to 26, the second SSC SSC2 has indices 1 to 27, and swapping between the first SSC SSC1 and the second SSC SSC2 is used. Accordingly, three scrambling codes can be acquired by selecting three indices among indices 28 to 30.

A scrambling code is selected from a currently used sequence set. Alternatively, a sequence is selected from the currently used sequence set and thereafter the sequence is altered to be used. For example, when an m-sequence is used, the m-sequence may be used as a scrambling code by using a reverse operation, truncation, cyclic extension, cyclic shift, etc. That is, in the Equation 4, a sequence of (1) and a sequence of (2) have a reverse relationship to each other. In this case, the sequence of (1) can be used as an SSC, and the sequence of (2) can be used as a scrambling code. When a pair of sequences having a reverse relationship is selected as a scrambling code, the SSC and the scrambling code can maintain an m-sequence relation. In addition, implementation is easy, and memory space can be saved.

Figure 18:
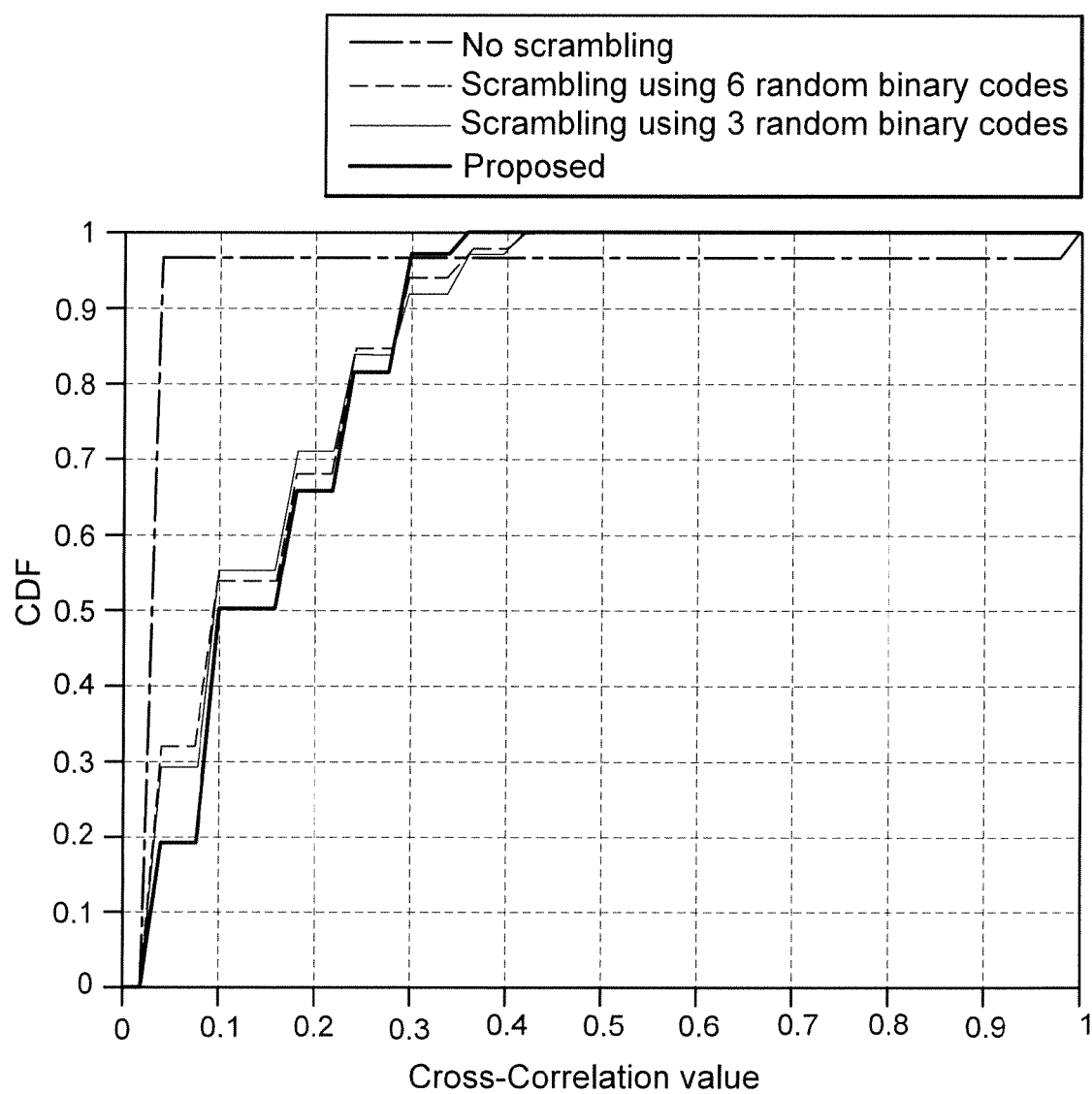
FIG. 18 is a graph showing a cumulative distribution function (CDF) of cross-correlation distribution for all possible collisions in two cells.

FIG. 18 is a graph showing a cumulative distribution function (CDF) of cross-correlation distribution for all possible collisions in two cells.

Referring to FIG. 18, the proposed method shows a similar characteristic of a random binary code. However, to use the random binary code as a scrambling code, a code generator or a memory is additionally required. On the contrary, the proposed method does not produce an additional overhead. This is because the proposed method requires only reconfiguration of a memory address.

Now, assume that an m-sequence of a polynomial $x^5 + x^2 + 1$ of Equation 1 is used as an SSC. In order for a UE to detect the SSC, the sequence has to be directly stored in a code generator or a memory capable of generating the sequence used in the SSC. The m-sequence generated by Equation 1 is subjected to cyclic shifting to acquire a total of 31 sequences. Instead of generating each SSC detection code by the code generator, if one m-sequence is stored in a memory and only a memory address is assigned and used, then only one m-sequence having a length of 31 needs to be stored in the memory. If the sequence is used in a reverse order, only an order for indicating the memory address needs to be changed and used.

For example, assume that an m-sequence generated by Equation 1 is expressed as (a)={1, 1, −1, 1, −1, −1, 1, 1, −1, −1, −1, −1, −1, 1, 1, 1, −1, −1, 1, −1, −1, −1, 1, −1, 1, −1, 1, 1, 1, 1, −1}. An equivalent sequence can also apply to −(a). The remaining 30 sequences can be generated by performing cyclic shifts 30 times on the sequence (a). Thus, only a memory for storing the sequence (a) is needed. To use sequences having a reverse relationship, it is sufficient to operate, only one time, the memory for storing the sequence (a) or the code generator for generating the sequence (a).

However, if the sequence is not reversed and other types of sequences (e.g., a random sequence, a computer search sequence, etc.) other than the m-sequence are used, a memory for storing six scrambling codes associated with three PSCs is additionally required. That is, although it is sufficient to store one sequence having a length of 31 in the memory when reversely-related sequences are used, the memory for storing six sequences having a length of 31 is additionally required when different sequences are used.

In the selection of a scrambling code, an excellent feature can be achieved by generating an m-sequence after selecting a polynomial satisfying Equations 2 and 3 above (or after reversing the order of the coefficients of the polynomial in the order n-k). When the m-sequence generated by $x^5+x^2+1$ of Equation 1 is reversed, the sequence is converted into one of m-sequences generated by $x^5+x^3+1$, which is called as a pair relationship. For example, when a sequence, which is generated by $x^5+x^2+1$ and is cyclic-shifted 0 times, is reversed, the resulting sequence is identical to a sequence which is generated by $x^5+x^3+1$ and is cyclic-shifted 26 times. Thus, when a pair of sequences having a reverse relationship is selected as a scrambling code, the UE can be easily implemented, and memory capacity can be saved.

VII. SSC1-Based Scrambling of SSC2

Now, an application of determining a scrambling sequence used in an SSC2 according to a sequence index used in an SSC1 (i.e., application of reverse-m) will be described.

In order to solve an additional ambiguity problem when a neighbor cell is searched for, there is a method for selecting and using a scrambling sequence one-to-one corresponding to a sequence index used in a first SSC1, wherein a combination of two codes (e.g., (SSC1, SSC2)) is used in a SSS. In this case, for example, regarding the aforementioned 31-length m-sequence (31 sequence indices are possible) using the polynomial $x^5+x^2+1$, a sequence corresponding to an index of the m-sequence may be reversed to be used. For example, if the index of the SSC1 is 0, the sequence may be reversed to be used as a scrambling code for the SSC2. Alternatively, when SSC1-based SSC2 scrambling is used, all or some parts of the sequence used in the SSC1 may be reversed to be used as a scrambling code. In summary, a sequence used in the SSC1 can be reversed to be used as the scrambling code of the SSC2. This is not limited to the number of scrambling codes, a one-to-one mapping relation, etc. In addition, polynomials in a reverse relationship can be selected.

Now, a case where the aforementioned description applies to [PSC-based scrambling+SSC1-based scrambling] is disclosed.

Since a reverse-m is applied to SSC1-based scrambling in this case, for convenience, a PSC-based sequence may use a 63-length m-sequence and punctures the sequence if necessary or may use two different types of m-sequences of a different polynomial. The scrambled SSC can be expressed as follows.

$P\tilde{x}(SSC1,SSC2)=P\tilde{x}(si,sj)$, or $(P\tilde{x}SSC1,P\tilde{x}SSC2)=(P\tilde{x}si,P\tilde{x}sj)$, or $(P1\tilde{x}SSC1,P2\tilde{x}SSC2)=(P1\tilde{x}si,P2\tilde{x}sj)$ Herein, P denotes a PSC-based scrambling code. Note that P does not change whether scrambling is performed on the whole parts of an SSC or whether scrambling is performed individually on each part of the SSC.

The SSC1-based scrambling is applied to a SSC2, as expressed by the following expression.

$P\tilde{x}(SSC1,SCR1\tilde{x}SSC2)=P\tilde{x}(si,rev(si)\tilde{x}sj)$, or $(P\tilde{x}SSC1,SCR1\tilde{x}P\tilde{x}SSC2)=(P\tilde{x}si,SCR1\tilde{x}P\tilde{x}sj)$, or $(P1\tilde{x}SSC1,SCR1\tilde{x}P2\tilde{x}SSC2)=(P1\tilde{x}si,SCR1\tilde{x}P2\tilde{x}sj)$ Herein, SCR1 denotes a SSC1-based scrambling code and rev(•) denotes reverse operation (or a reverse-m). Of course, as described above, the operation is equivalent to the selection and the use of polynomials (herein, $x^5+x^3+1$) having a reverse relationship.

In the present example, si is directly reversed to be scrambled to sj. However, the present invention is not limited thereto, and thus a reversely-related polynomial or a reversely-related sequence may also be defined and used as a scrambling code.

When the SSC1-based scrambling is applied to the SSC2, a combination form, such as, the aforementioned PSC-based scrambling+SSC1-based scrambling, can be used.

The reverse-m of the present invention may be used, as described above, to the PSC-based scrambling scheme alone, the SSC1-based scrambling scheme alone, either one of the two scrambling schemes, or both of the two scrambling schemes.

VIII. Cell Search

A cell search is the procedure by which a UE acquires time and frequency synchronization with a cell and detects the cell identity of the cell. In general, cell search is classified into initial cell search, which is performed in an initial stage after a UE is powered on, and non-initial cell search which performs handover or neighbor cell measurement.

The cell search uses a PSS and a SSS. The PSS is used to acquire slot synchronization (or frequency synchronization) and a unique identity. The SSS is used to acquire frame synchronization and a cell identity group. A cell identity for the cell is acquired by the unique identity within the cell identity group.

Figure 19:
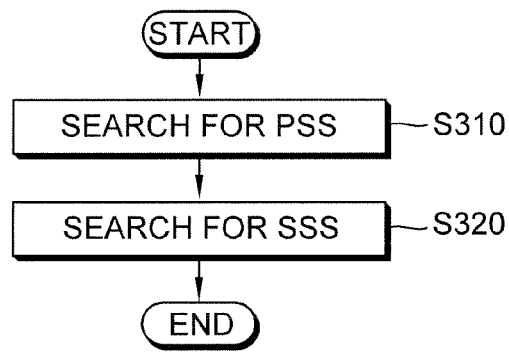
FIG. 19 is a flowchart showing cell search according to an embodiment of the present invention.

FIG. 19 is a flowchart showing a cell search procedure according to an embodiment of the present invention.

Referring to FIG. 19, a UE searches for a PSS (step S310). A UE identifies a PSC by the PSS transmitted from a base station. Slot synchronization are acquired by using the PSS. Frequency synchronization can also be acquired by using the PSS. A PSC in the PSS is associated with an unique identity. When there are 3 unique identities, each of 3 PSC is one-to-one mapped to the each of the unique identities.

Next, the UE searches for a SSS (step S320). The UE identifies two SSCs by the SSS transmitted from the base station. Frame synchronization is acquired by using the SSS. The SSS is mapped to a cell identity group. By using the SSS and the PSS, cell identity is acquired. For example, it is assumed that there are 504 unique cell identities, the cell identities are grouped into 168 unique cell identity groups and each group contains three unique identities. 3 PSSs are respectively mapped to the three unique identities and 168 SSSs are respectively mapped to 168 cell identity groups. A cell identity $I_{cell}$ can thus be uniquely defined by a number $I_{gr}$ in the range of 0 to 167, representing the cell-identity group, and a number $I_u$ in the range of 0 to 2, representing the unique identity within the cell-identity group as shown $I_{cell}=3I_{gr}+I_u$.

The SSS includes two SSCs. Each SSC is scrambled by using different scrambling codes. The scrambling code is associated with the PSC included in the PSS. Therefore, cell search can be performed much faster by reducing interference of a neighbor cell and by improving SSS detection performance.

Detection performance of a SSS can be improved by scrambling two SSCs in the SSS using different scrambling codes. Cell search can be performed more reliably and can be prevented from being delayed. In addition, with an increase in the number of available sequences, an amount of information carried by the synchronization signals and capacity of a user equipment can be increased.

Although synchronization signals have been described above, technical features of the present invention may also apply to other signal which delivers information in order to improve channel detection performance. For example, this can apply to an uplink/downlink reference signal, an ACK/NACK signal, a random access preamble, etc.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing cell search in a wireless communication system, performed by a user equipment, the method comprising:
    searching a primary synchronization signal comprising a primary synchronization code (PSC); and
    searching a secondary synchronization signal comprising two secondary synchronization codes (SSCs),
    wherein the two SSCs are respectively scrambled by using two different scrambling codes, the two scrambling codes being defined by m-sequences generated by a generating polynomial $x^5+x^3+1$, and wherein the two SSCs are defined by m-sequences generated by a generating polynomial $x^5+x^2+1$.

2. The method of claim 1, wherein the secondary synchronization signal includes a first secondary synchronization signal and a second secondary synchronization signal, and the two scrambling codes used for the first secondary synchronization signal are the same as the two scrambling codes used for the second secondary synchronization signal.

3. The method of claim 1, wherein the generating polynomial $x^5+x^2+1$ and the generating polynomial $x^5+x^3+1$ have reverse relationship to each other.

4. The method of claim 1, wherein a SSC has the same length as a scrambling code.

5. The method of claim 1, wherein the two SSCs are generated by using different cyclic shifts.

6. The method of claim 1, wherein the two scrambling codes are generated by using different cyclic shifts.

7. The method of claim 1, wherein the two scrambling codes are associated with the PSC.

8. The method of claim 1, wherein the primary synchronization signal and the secondary synchronization signal are received in consecutive orthogonal frequency division multiplexing (OFDM) symbols.

9. The method of claim 1, wherein the two SSCs are mapped to subcarriers in an interleaved manner.

10. A method of transmitting synchronization signals in a wireless communication system, performed by a base station, the method comprising:
    transmitting a primary synchronization signal comprising a primary synchronization code (PSC); and
    transmitting a first secondary synchronization signal comprising a first secondary synchronization code (SSC) and a second SSC,
    wherein the first SSC is scrambled by using a first scrambling code and the second SSC is scrambled by using a second scrambling code, the first SSC and the second SSC being defined by m-sequences generated by a generating polynomial $x^5+x^2+1$, and wherein the first scrambling code and the second scrambling code are defined by m-sequences generated by a generating polynomial $x^5+x^3+1$.

11. The method of claim 10, wherein the first SSC and the second SSC are generated by using different cyclic shifts.

12. The method of claim 10, wherein the first scrambling code and the second scrambling code are generated by using different cyclic shifts.

13. A user equipment configured for performing cell search in a wireless communication system, wherein the user equipment comprises a microprocessor that is configured for:
    searching a primary synchronization signal comprising a primary synchronization code (PSC); and
    searching a secondary synchronization signal comprising two secondary synchronization codes (SSCs),
    wherein the two SSCs are respectively scrambled by using two different scrambling codes, the two scrambling codes being defined by m-sequences generated by a generating polynomial $x^5+x^3+1$, and wherein the two SSCs are defined by m-sequences generated by a generating polynomial $x^5+x^2+1$.

* * * * *